US012345223B2

(12) United States Patent
Malinovic et al.

(10) Patent No.: US 12,345,223 B2
(45) Date of Patent: Jul. 1, 2025

(54) AIR INTAKE VIBRATION ISOLATION SYSTEMS FOR VEHICLE ENGINES

(71) Applicant: Arctic Cat Inc., Thief River Falls, MN (US)

(72) Inventors: Nenad Malinovic, Emmingen-Liptingen (DE); Sergej Tkatschenko, Friedrichshafen (DE); Ralf Centmayer, Markdorf (DE)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 18/744,325

(22) Filed: Jun. 14, 2024

(65) Prior Publication Data
US 2025/0035077 A1 Jan. 30, 2025

Related U.S. Application Data

(60) Provisional application No. 63/528,774, filed on Jul. 25, 2023.

(51) Int. Cl.
| | | |
|---|---|---|
| *B62J 35/00* | (2006.01) | |
| *B62J 37/00* | (2006.01) | |
| *B62M 27/02* | (2006.01) | |
| *F01N 13/10* | (2010.01) | |
| *F02M 35/10* | (2006.01) | |
| *F02M 35/16* | (2006.01) | |

(52) U.S. Cl.
CPC ........ *F02M 35/10295* (2013.01); *B62J 35/00* (2013.01); *B62J 37/00* (2013.01); *B62M 27/02* (2013.01); *F01N 13/10* (2013.01); *F02M 35/10026* (2013.01); *F02M 35/162* (2013.01); *B62M 2027/023* (2013.01); *B62M 2027/028* (2013.01)

(58) Field of Classification Search
CPC ............... F02M 35/10026; F02M 35/10295
See application file for complete search history.

(56) References Cited

U.S. PATENT DOCUMENTS

| | | | |
|---|---|---|---|
| 4,901,681 A * | 2/1990 | Pozniak | ........... F02M 35/10137 277/916 |
| 7,150,336 B2 | 12/2006 | Desmarais | |
| 9,174,702 B1 | 11/2015 | Gauthier et al. | |
| 9,789,930 B1 | 10/2017 | Vezina et al. | |
| 9,845,004 B2 | 12/2017 | Hedlund et al. | |
| 9,850,861 B2 | 12/2017 | Eshima et al. | |
| 10,450,968 B2 | 10/2019 | Bernier et al. | |
| 2004/0107933 A1* | 6/2004 | Lee | ................. F02M 35/10301 123/184.21 |

* cited by examiner

*Primary Examiner* — Kevin A Lathers
(74) *Attorney, Agent, or Firm* — Lawrence Youst PLLC

(57) ABSTRACT

An engine includes an engine body assembly and an air intake system including an air plenum. The air plenum is positioned above the engine body assembly. The engine includes an air plenum support bracket having an upper arm coupled to the air plenum and a lower arm coupled to the engine body assembly. The engine also includes a vibration isolator coupled to the air plenum support bracket and interposed between the air plenum and the engine body assembly, thereby inhibiting engine vibrations from transferring to the air plenum.

13 Claims, 19 Drawing Sheets

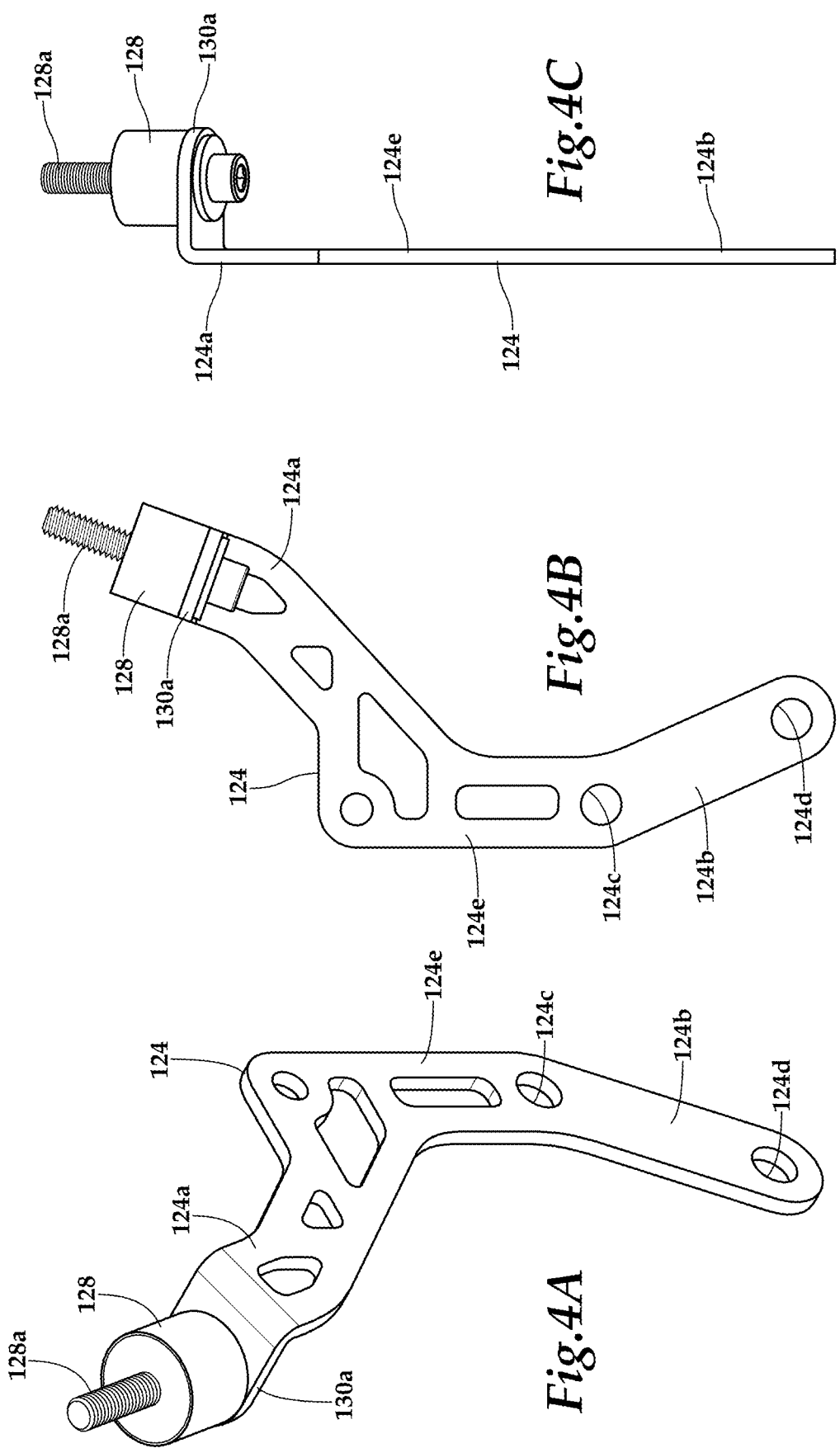

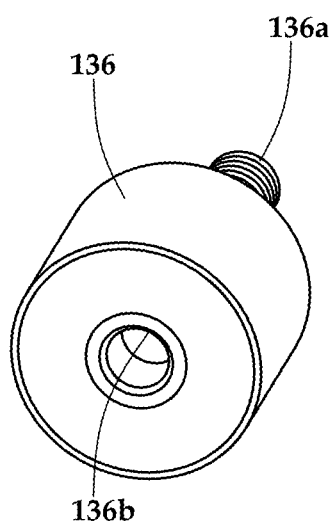
*Fig.6A*
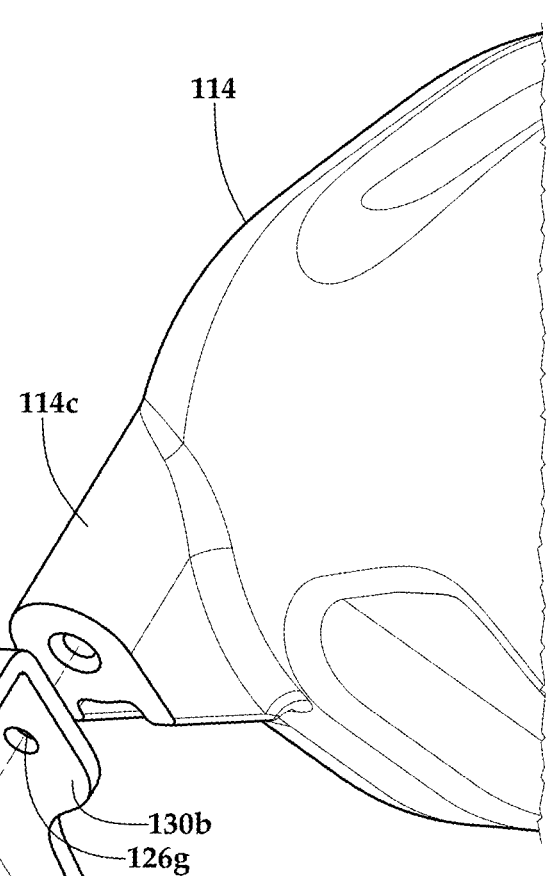
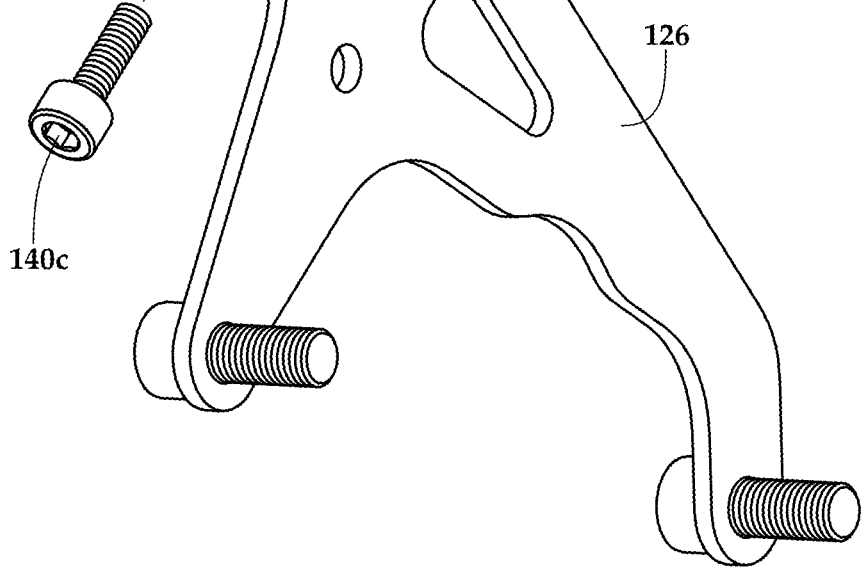
*Fig.6B*

AIR INTAKE VIBRATION ISOLATION SYSTEMS FOR VEHICLE ENGINES

CROSS-REFERENCE TO RELATED APPLICATIONS

The present application claims the benefit of U.S. Provisional Application No. 63/528,774, filed Jul. 25, 2023, the entire contents of which are incorporated by reference herein for all purposes.

TECHNICAL FIELD OF THE DISCLOSURE

The present disclosure relates, in general, to vehicle engines and, in particular, to isolating an air intake system of an engine from vibrations emanating from the engine block assembly, thereby protecting the air intake system and components coupled thereto from damage.

BACKGROUND

Snowmobiles are popular land vehicles used for transportation and recreation in cold and snowy conditions. Certain snowmobiles are designed for specific applications such as trail, utility, mountain, race and crossover applications, to name a few. Snowmobiles typically include a frame assembly, or chassis, that supports various components of the snowmobile such as an engine, a transmission, a steering system and a ground-engaging endless drive track disposed in a longitudinally extending tunnel. The engine and transmission power the drive track to enable ground propulsion for the vehicle. A rider controls the operation of the snowmobile using the steering system including a handlebar assembly that is operatively linked to a pair of ski assemblies that provides flotation for the front end of the snowmobile over snow.

One of the critical systems of the engine is the air intake system. A primary function of the air intake system is to efficiently provide clean, filtered air to the engine cylinders in which the combustion process takes place. A typical air intake system has several key components including an air filter, air intake manifold and throttle body. The air filter removes dirt and debris from incoming air, ensuring that only clean air enters the engine cylinders. The air intake manifold distributes the filtered air to each of the engine cylinders, while the throttle body controls the amount of air entering the engine cylinders in response to driver input. Certain components of the air intake system may be particularly susceptible to vibrations emanating from the engine body including the cylinder block. For example, certain types of throttle bodies contain electronics that may be impaired when shaken. Additionally, certain components coupled to the air intake system may be sensitive to vibrations. Previous air intake systems have been rigidly or hard mounted onto the engine body, causing vibrations emanating from the engine body to rattle and potentially damage the air intake system including any sensitive components coupled thereto. Some designs have attempted to overcome this problem by mounting the throttle body directly to the engine body with a soft component interposed therebetween. However, such designs are often considered impractical or undesirable due to spatial, efficiency or other factors. Accordingly, a need has arisen for air intake systems that are vibrationally isolated from the engine body to protect sensitive components of the air intake system such as the throttle body as well as sensitive components attached thereto.

SUMMARY

In a first aspect, the present disclosure is directed to an engine for a vehicle. The engine includes an engine body assembly and an air intake system including an air plenum. The air plenum is positioned above the engine body assembly. The engine includes an air plenum support bracket having an upper arm coupled to the air plenum and a lower arm coupled to the engine body assembly. The engine also includes a vibration isolator coupled to the air plenum support bracket and interposed between the air plenum and the engine body assembly, thereby inhibiting engine vibrations from transferring to the air plenum.

In some embodiments, the engine body assembly may include a cylinder head. In such embodiments, the lower arm of the air plenum support bracket may be coupled to the cylinder head. In certain embodiments, the air plenum support bracket may include a left air plenum support bracket and a right air plenum support bracket. In such embodiments, the left air plenum support bracket may couple the left side of the air plenum to the left side of the engine body assembly and the right air plenum support bracket may couple the right side of the air plenum to the right side of the engine body assembly. In some embodiments, the left and right air plenum support brackets may be nonuniformly shaped. In certain embodiments, the engine body assembly may include a boss and the lower arm of the air plenum support bracket may define a fastener hole. In such embodiments, the engine may include a fastener insertable through the fastener hole defined by the lower arm of the air plenum support bracket and the boss of the engine body assembly to secure the lower arm of the air plenum support bracket to the engine body assembly. In some embodiments, the upper arm of the air plenum support bracket may define a fastener hole, the vibration isolator may have an underside defining a fastener hole and a top side defining a rod and the air plenum may include a boss configured to receive the rod of the vibration isolator. In such embodiments, the engine may include a fastener insertable through the fastener hole of the upper arm of the air plenum support bracket and the fastener hole defined by the underside of the vibration isolator to secure the upper arm of the air plenum support bracket to the vibration isolator.

In certain embodiments, the upper arm of the air plenum support bracket may define a vibration isolator support platform. In such embodiments, the vibration isolator may be interposed between the vibration isolator support platform and the air plenum such that the upper arm of the air plenum support bracket is coupled to the air plenum via the vibration isolator. In some embodiments, the lower arm of the air plenum support bracket may bifurcate into a forward arm and an aft arm. In such embodiments, the forward and aft arms may each be coupled to the engine body assembly. In certain embodiments, the lower arm of the air plenum support bracket may be coupled to one of the lateral sides of the engine body assembly. In some embodiments, the upper arm of the air plenum support bracket may be coupled to a forward portion of the underside of the air plenum. In certain embodiments, the vibration isolator may be a substantially cylindrical vibration isolator. In some embodiments, the vibration isolator may include an elastomeric material.

In a second aspect, the present disclosure is directed to an engine for a vehicle. The engine includes an engine body assembly and an air intake system coupled to the engine body assembly. The air intake system includes an air plenum defining an air discharge port, an air intake runner having an air inlet port and an annular isolation cuff having an upstream end coupled to the air discharge port of the air plenum and a downstream end coupled to the air inlet port of the air intake runner to provide fluid communication between the air plenum and the air intake runner. The isolation cuff inhibits engine vibrations from transferring to the air plenum.

In some embodiments, the air plenum may have a plurality of air discharge ports and the air intake runner may be an air runner assembly including a plurality of air intake runners each having an air inlet port. In such embodiments, the isolation cuff may include a plurality of isolation cuffs interposed between the air discharge ports of the air plenum and the air inlet ports of the air runner assembly. In certain embodiments, the isolation cuff may have an internal surface defining an annular internal divider interposed between the air discharge port of the air plenum and the air inlet port of the air intake runner. In some embodiments, the isolation cuff may have an internal surface defining an upstream annular positioning ridge and a downstream annular positioning ridge. In such embodiments, the air discharge port of the air plenum may define an annular groove configured to receive the upstream positioning ridge to securely position the air discharge port relative to the isolation cuff. Also in such embodiments, the air inlet port of the air intake runner may define an annular groove configured to receive the downstream positioning ridge to securely position the air inlet port relative to the isolation cuff. In certain embodiments, the isolation cuff may have an external surface defining an upstream clamp groove and a downstream clamp groove, the clamp grooves separated by an annular divider. In such embodiments, the air intake system may include an upstream hose clamp received by the upstream clamp groove to secure the upstream end of the isolation cuff to the air discharge port of the air plenum and a downstream hose clamp received by the downstream clamp groove to secure the downstream end of the isolation cuff to the air inlet port of the air intake runner. In some embodiments, the isolation cuff may include an elastomeric material. In certain embodiments, the isolation cuff may be a monolithic component.

In a third aspect, the present disclosure is directed to an engine for a vehicle. The engine includes an engine body assembly and an air intake system coupled to the engine body assembly. The air intake system includes an air plenum having an air discharge port and an air intake runner having an air inlet port in fluid communication with the air discharge port of the air plenum. The air intake system includes a bracket having an upstream end coupled to the air plenum and a downstream end coupled to the air intake runner. The air intake system also includes a vibration isolator coupled to the bracket and interposed between the air plenum and the air intake runner. The vibration isolator inhibits engine vibrations from transferring to the air plenum.

In some embodiments, the aft side of the air plenum may include a boss, a lateral side of the air intake runner may include a boss and the upstream and downstream ends of the bracket may each define a fastener hole. In such embodiments, the air intake system may include a first fastener insertable through the fastener hole defined by the upstream end of the bracket and the boss on the aft side of the air plenum and a second fastener insertable through the fastener hole defined by the downstream end of the bracket and the boss on the lateral side of the air intake runner. In certain embodiments, the air plenum may be disposed above the engine block assembly. In some embodiments, the air plenum may have a plurality of air discharge ports and the air intake runner may include an air runner assembly including a plurality of air intake runners each having an air inlet port, each air inlet port in fluid communication with a respective one of the air discharge ports. In such embodiments, the bracket may include a left bracket having an upstream end coupled to the air plenum and a downstream end coupled to the left side of the air runner assembly and a right bracket having an upstream end coupled to the air plenum and a downstream end coupled to the right side of the air runner assembly. Also in such embodiments, the vibration isolator may include a left vibration isolator and a right vibration isolator, the left vibration isolator coupled to the left bracket and interposed between the air plenum and the left side of the air runner assembly, the right vibration isolator coupled to the right bracket and interposed between the air plenum and the right side of the air runner assembly. In certain embodiments, the bracket may be an L-bracket. In some embodiments, the vibration isolator may include an elastomeric material. In certain embodiments, the vibration isolator may be a grommet, and the bracket may define a fastener hole configured to receive the grommet. In some embodiments, the downstream end of the bracket may define the fastener hole configured to receive the grommet such that the grommet is interposed between the bracket and the air intake runner.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4C are various views of a left air plenum support bracket in accordance with embodiments of the present disclosure;

FIGS. 6A-6B are various views of an air plenum support bracket mounted to an air plenum using a vibration isolator in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
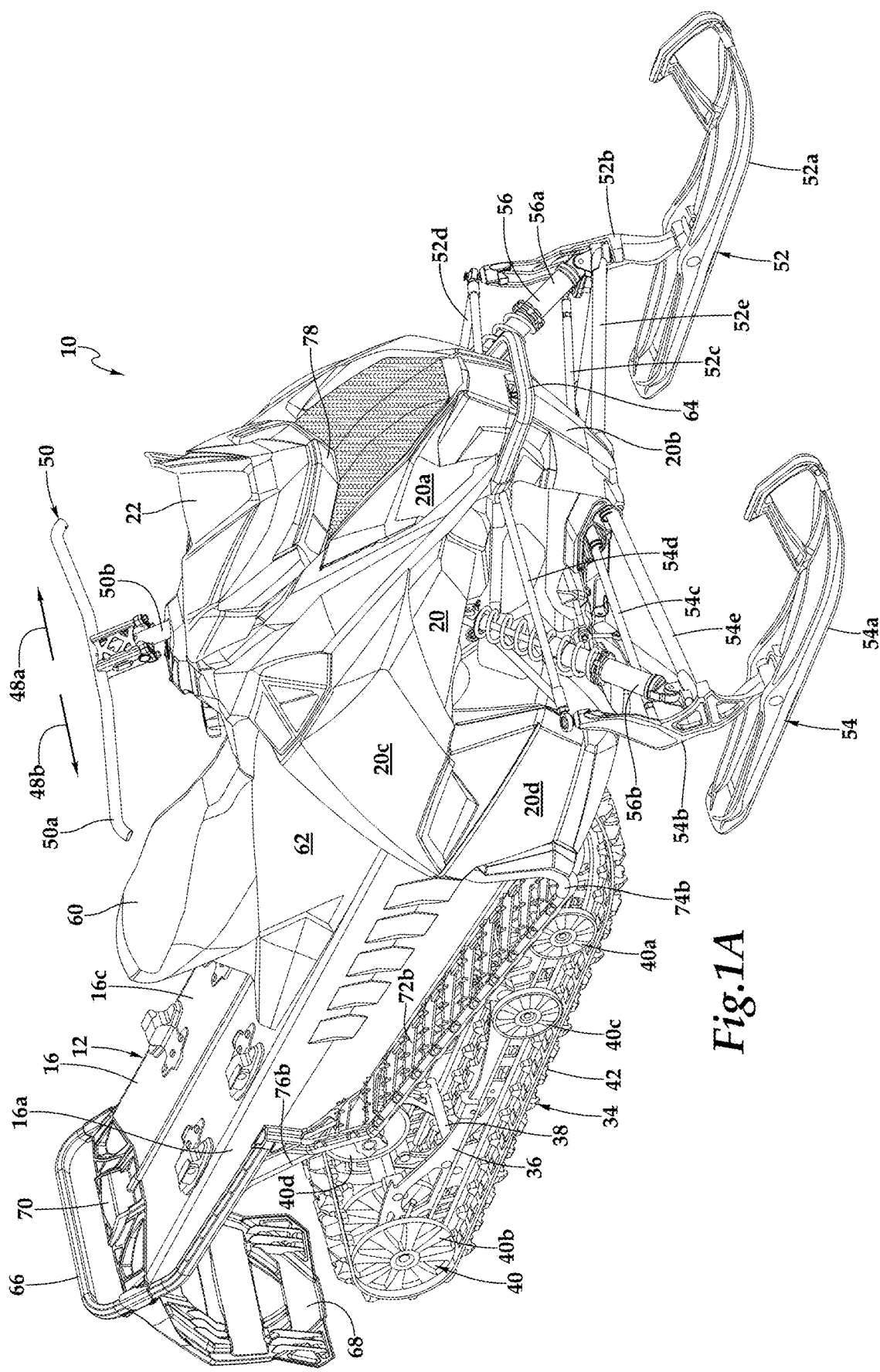
FIGS. 1A-1C are schematic illustrations of a snowmobile including vibration isolation elements in accordance with embodiments of the present disclosure.
Figure 1B:
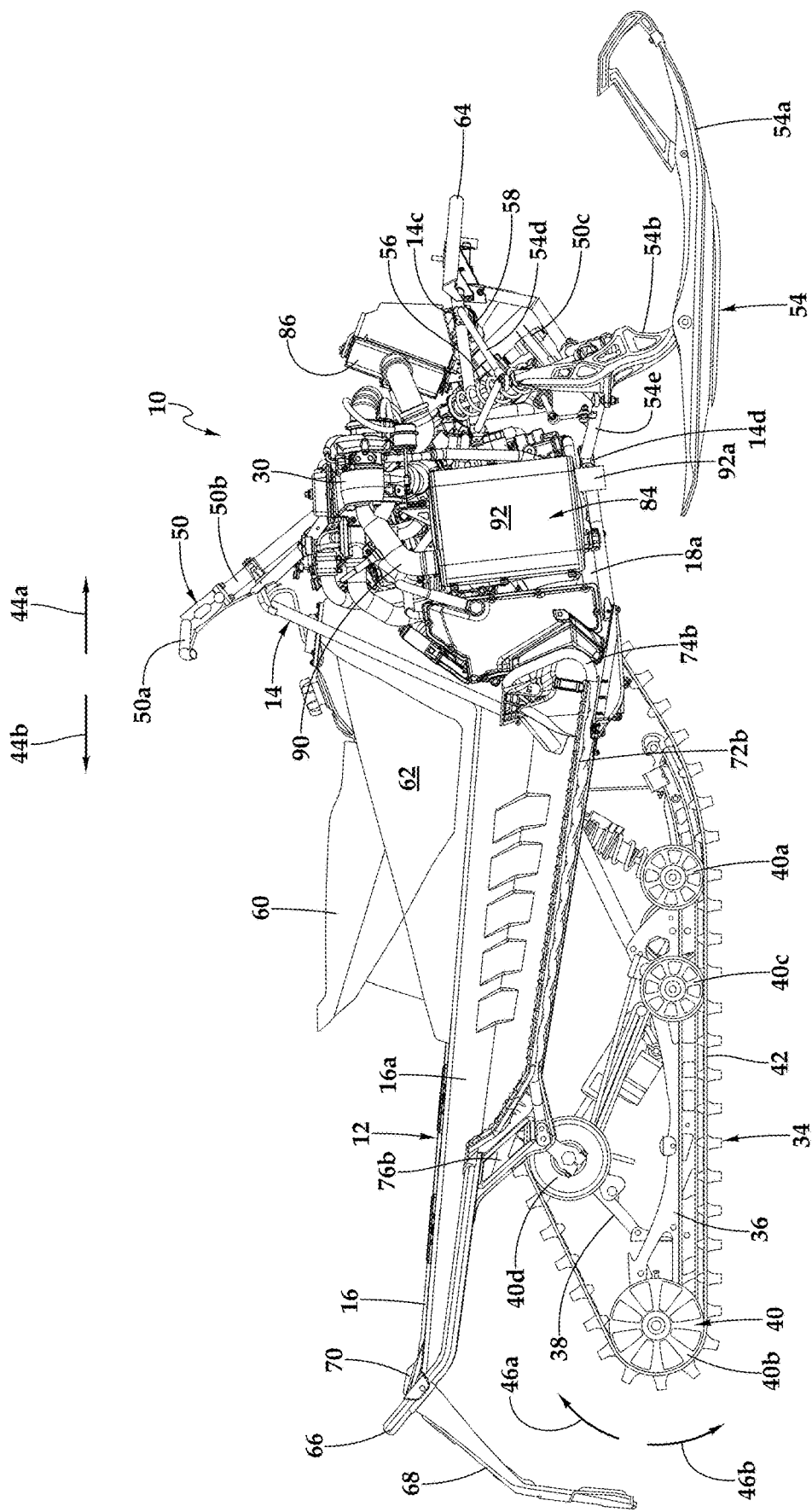
Figure 1C:
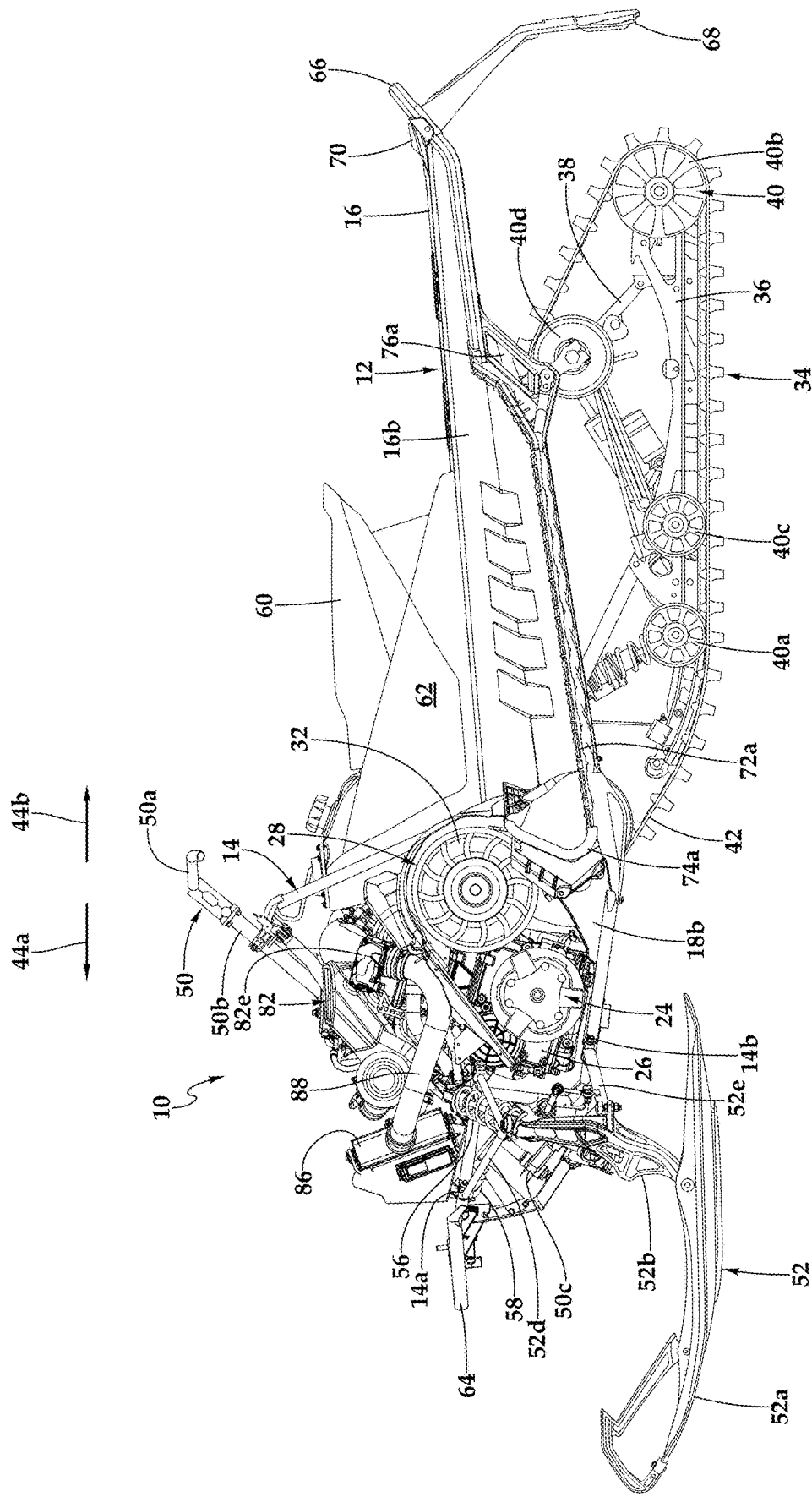

Referring to FIGS. 1A-1C in the drawings, a land vehicle depicted as a snowmobile is schematically illustrated and generally designated 10. Structural support for snowmobile 10 is provided by a chassis 12 that includes a forward frame assembly 14 and a longitudinally extending tunnel 16. Forward frame assembly 14 may be formed from interconnected tubular members such as round and hollow tubular members comprised of metal, metal alloy, polymeric materials, fiber reinforced polymer composites and/or combinations thereof that are coupled together by welds, bolts, pins or other suitable fastening means. A right side plate member 18a and a left side plate member 18b are coupled to and preferably welded to forward frame assembly 14 such that forward frame assembly 14 and plate members 18a, 18b form a welded frame assembly. Tunnel 16 is coupled to forward frame assembly 14 and plate members 18a, 18b with welds, bolts, rivets or other suitable means. In the illustrated embodiment, tunnel 16 includes a right sidewall 16a, a left sidewall 16b and a top panel 16c. Tunnel 16 may be integrally formed or may consist of multiple members that are coupled together with welds, bolts, rivets or other suitable means. Plate members 18a, 18b and tunnel 16 may be formed from sheet metal, metal alloy, fiber reinforced polymer or other suitable material or combination of materials.

Various components of snowmobile 10 are assembled on or around forward frame assembly 14. One or more body panels 20 cover and protect the various components of snowmobile 10 including parts of forward frame assembly 14. For example, hood panels 20a, a nose panel 20b, an upper right side panel 20c and a lower right side panel 20d shield underlying componentry from snow and terrain. Similarly, an upper left side panel and a lower left side panel (not visible) also shield underlying componentry from snow and terrain. In the illustrated embodiment, snowmobile 10 has a windshield 22 that shields the rider of snowmobile 10 from snow, terrain and frigid air during operation. Even through snowmobile 10 has been described and depicted as including specific body panels 20, it should be understood by those having ordinary skill in the art that a snowmobile of the present disclosure may include any number of body panels 20 in any configuration to provide shielding functionality.

Body panels 20 have been removed from snowmobile 10 in FIGS. 1B-1C to reveal the underlying components of snowmobile 10. For example, snowmobile 10 has a powertrain 24 that includes an engine 26 and a drivetrain 28 both of which are coupled to forward frame assembly 14. Engine 26 resides in an engine bay formed within forward frame assembly 14. Engine 26 may be any type of engine such as a four-stroke engine, a two-stroke engine, an electric motor or other prime mover. In the illustrated embodiment, engine 26 is a forced induction internal combustion engine that receives boost from a turbocharger 30. In other embodiments, engine 26 may operate as a naturally aspirated internal combustion engine. Engine 26 converts thermal energy into mechanical energy to drive the moving parts of snowmobile 10, thereby enabling motion.

In the illustrated embodiment, drivetrain 28 includes a transmission depicted as a continuously variable transmission 32 that varies the ratio of the engine output speed to the drive track input speed. In other embodiments, the transmission for snowmobile 10 may be an electrically variable transmission or other suitable transmission type. A drive track system 34 is at least partially disposed within and/or below tunnel 16 and is in contact with the ground to provide ground propulsion for snowmobile 10. Torque and rotational energy are provided to drive track system 34 from powertrain 24. Drive track system 34 includes a track frame 36 and a rear suspension assembly 38 that is coupled to tunnel 16. A plurality of idler wheel assemblies 40 are rotatably coupled to track frame 36 and rear suspension assembly 38 including a forwardmost idler wheel assembly 40a, an aftmost idler wheel assembly 40b, an intermediate idler wheel assembly 40c and an uppermost idler wheel assembly 40d. Drive track system 34 also includes a ground-engaging endless drive track 42 that is driven by a track drive sprocket via a track driveshaft (not visible) that is rotated responsive to torque provided from powertrain 24. The track drive sprocket is considered to be a component of powertrain 24 as well as a component of drive track system 34.

Drive track 42 rotates around idler wheel assemblies 40 of track frame 36 and rear suspension assembly 38 to propel snowmobile 10 in either the forward direction, as indicated by arrow 44a, or the backward direction, as indicated by arrow 44b. When viewed from the right side of snowmobile 10, as best seen in FIG. 1B, drive track 42 rotates around idler wheel assemblies 40 of track frame 36 and rear suspension assembly 38 in the clockwise direction, as indicated by arrow 46a, to propel snowmobile 10 in the forward direction 44a and in the counterclockwise direction, as indicated by arrow 46b, to propel snowmobile 10 in the backward direction 44b. The backward direction may also be referred to herein as the aftward direction. The forward and backward directions also represent the longitudinal direction of snowmobile 10 with the lateral direction of snowmobile 10 being normal thereto and represented by the leftward direction, as indicated by arrow 48a, and the rightward direction, as indicated by arrow 48b. It should be understood by those having ordinary skill in the art that the left side and the right side of snowmobile 10 will be with reference to a rider of snowmobile 10 with the left side of snowmobile 10 corresponding to the left side of the rider and the right side of snowmobile 10 corresponding to the right side of the rider.

Snowmobile 10 has a steering system 50 that includes a handlebar assembly 50a that is operably coupled to a left ski assembly 52 and a right ski assembly 54 by a steering column 50b and a steering arm assembly 50c. Left ski assembly 52 includes a ski 52a, a spindle 52b, a tie rod 52c, an upper A-arm 52d and a lower A-arm 52e. Right ski assembly 54 includes a ski 54a, a spindle 54b, a tie rod 54c, an upper A-arm 54d and a lower A-arm 54e. Left ski assembly 52 is pivotably coupled to forward frame assembly 14 by upper A-arm 52d and lower A-arm 52e. Likewise, right ski assembly 54 is pivotably coupled to forward frame assembly 14 by upper A-arm 54d and lower A-arm 54e. More specifically, upper A-arm 52d couples left ski assembly 52 to forward frame assembly 14 at upper A-arm mounts 14a. Lower A-arm 52e couples left ski assembly 52 to forward frame assembly 14 at lower A-arm mounts 14b. Upper A-arm 54d couples right ski assembly 54 to forward frame assembly 14 at upper A-arm mounts 14c. Lower A-arm 54e couples right ski assembly 54 to forward frame assembly 14 at lower A-arm mounts 14d. Left ski assembly 52 and right ski assembly 54 may be collectively referred to herein as a ski system.

Snowmobile 10 has a front suspension assembly 56 that is coupled between each of ski assemblies 52, 54 and forward frame assembly 14 to provide front end support for snowmobile 10. More specifically, a left shock absorber 56a couples left ski assembly 52 to forward frame assembly 14 and a right shock absorber 56b couples right ski assembly 54 to forward frame assembly 14. Steering system 50 enables the rider to steer snowmobile 10 by rotating handlebar assembly 50a which causes skis 52a, 54a to pivot. In the illustrated embodiment, the pivoting of skis 52a, 54a responsive to rotation of handlebar assembly 50a is assisted by an electric power steering system (EPS) depicted as electronic steering assist unit 58.

The rider controls snowmobile 10 from a seat 60 that is positioned atop a fuel tank 62, above tunnel 16, aft of handlebar assembly 50a and aft of forward frame assembly 14. Snowmobile 10 has a front bumper 64 that is coupled to forward frame assembly 14. Snowmobile 10 has an aft bumper 66 that is coupled to an aft end of tunnel 16 and includes a cross member positioned aft of tunnel 16 to allow a person to lift the rear end of snowmobile 10 in the event that snowmobile 10 becomes stuck or needs to be repositioned when it is not moving. A snow flap 68 is coupled to aft bumper 66 and is configured to deflect snow emitted by drive track 42. A taillight housing 70 is coupled between aft bumper 66 and the aft end of tunnel 16 and is configured to house a taillight of snowmobile 10. Snowmobile 10 includes a left side running board assembly 72a and a right side running board assembly 72b. At its forward end, running board assembly 72a is coupled to forward frame assembly 14 by an attachment rail 74a. In addition, running board assembly 72a is coupled to tunnel 16 via a left side tunnel bracket 76a. At its forward end, running board assembly 72b is coupled to forward frame assembly 14 by an attachment rail 74b. In addition, running board assembly 72b is coupled to tunnel 16 via a right side tunnel bracket 76b. Snowmobile 10 includes a headlight assembly 78.

Figure 2A:
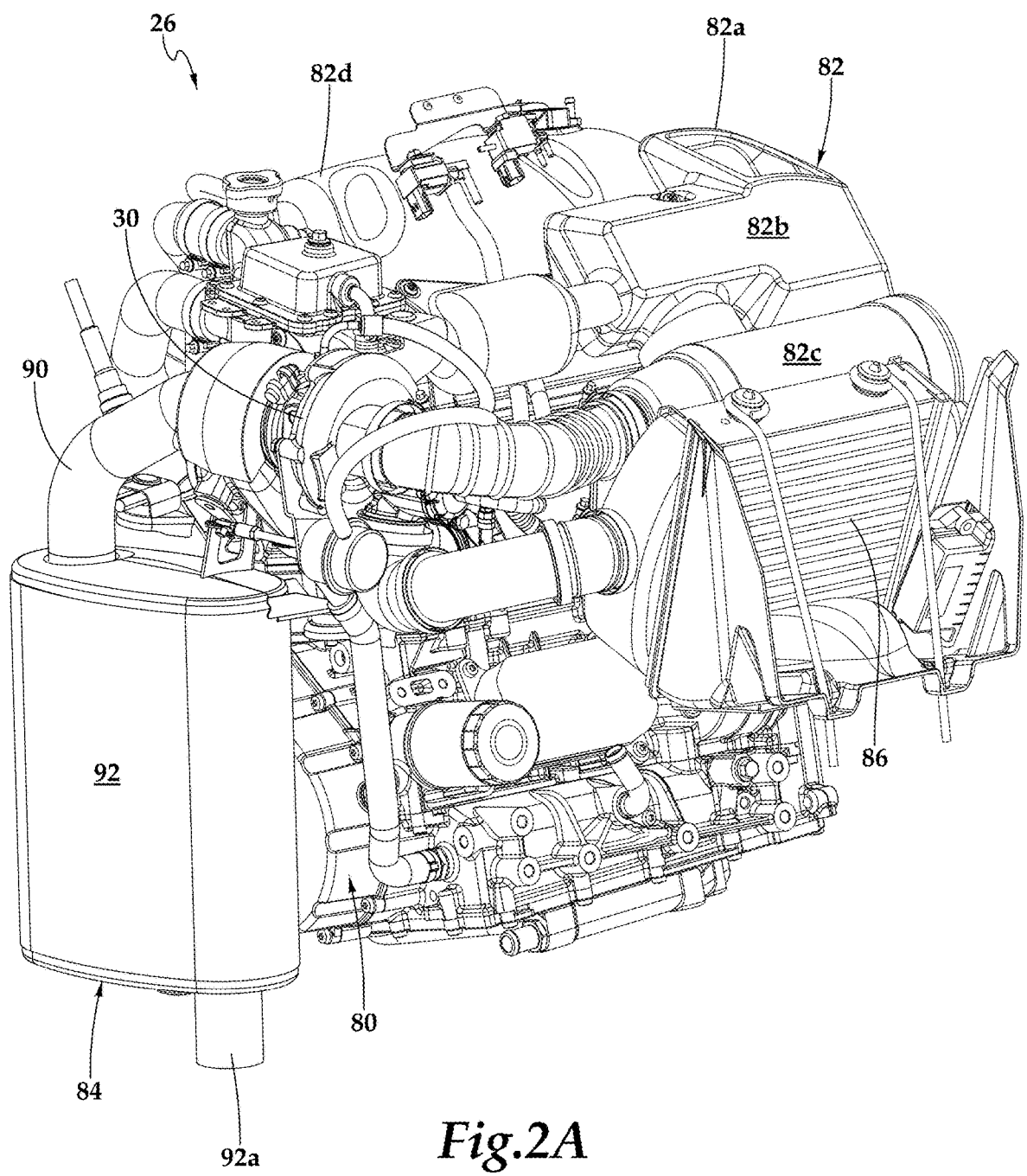
FIGS. 2A-2B are isometric views of a turbocharged internal combustion engine including an air intake system, an exhaust system and a cooling system for a snowmobile in accordance with embodiments of the present disclosure.
Figure 2B:
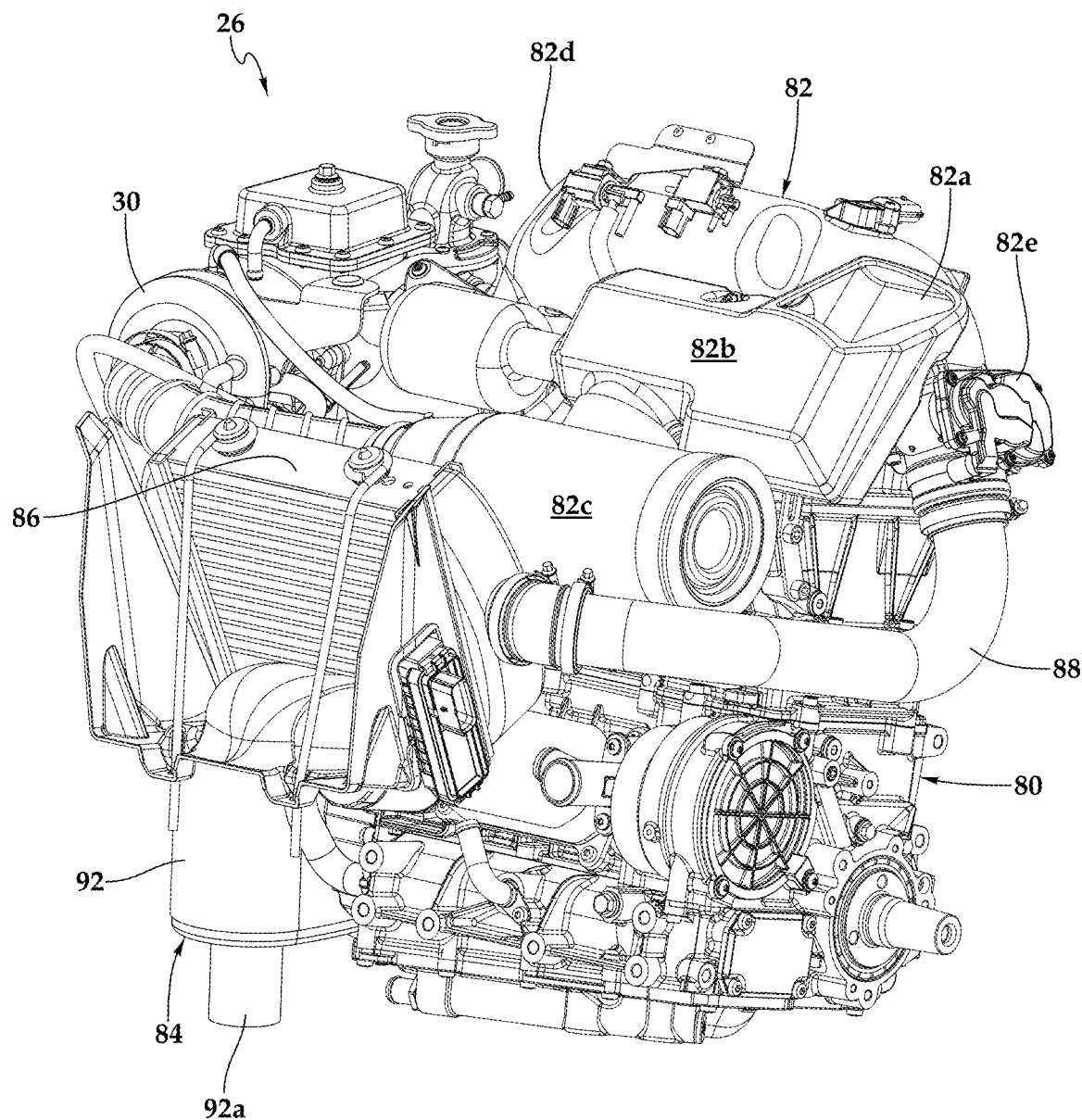

Referring additionally to FIGS. 2A-2B in the drawings, engine 26 includes a number of subsystems including an engine body assembly 80, an air intake system 82, an exhaust system 84 and turbocharger 30. Air intake system 82 receives and filters air from the atmosphere to provide clean air for use in the combustion process that takes place in engine body assembly 80, which includes a number of engine cylinders. Air intake system 82 includes an air inlet 82a that feeds air into an airbox 82b that is positioned generally forward and generally above engine body assembly 80. Air is then fed into turbocharger 30 via an air filter 82c, which removes dirt and debris from incoming air. Turbocharger 30 also receives exhaust gases exiting engine body assembly 80. The exhaust gases from engine body assembly 80 are harnessed to increase the amount of air entering the engine cylinders, thereby increasing the power and efficiency of engine 26. Specifically, turbocharger 30 includes a turbine driven by the exhaust gases exiting engine body assembly 80 via an exhaust manifold (not shown). Turbocharger 30 also includes a compressor, which is driven by the turbine to draw in outside air from airbox 82b via air filter 82c and compress the received air, resulting in compressed air that has a higher density. The compressed air is then routed through an intercooler 86, which cools the compressed air, further increasing the density of the compressed air. The cooled and compressed air is then routed to an air intake manifold 82d of air intake system 82 via an intake conduit 88. Air intake manifold 82d receives and distributes the cooled and compressed air to each of the engine cylinders in engine body assembly 80. A throttle body 82e is coupled to the upstream end of air intake manifold 82d and controls the amount of cooled and compressed air entering engine body assembly 80 in response to driver input. The cooled and compressed air is mixed with fuel at air intake manifold 82d before being delivered to the engine cylinders for combustion. Turbocharged engine 26 is a type of forced induction system that utilizes exhaust gases to force more air into each engine cylinder during the intake stroke to enhance the engine's overall efficiency and power output. It should be appreciated by one of ordinary skill in the art that the illustrative embodiments disclosed herein may be utilized in turbocharged engines, naturally aspirated engines or other engine types. The exhaust gases exiting engine body assembly 80, after being utilized by turbocharger 30, are directed away from engine 26 and the rider of snowmobile 10 via an exhaust duct 90 and a muffler 92, which includes an exhaust outlet 92a. Exhaust system 84 including muffler 92 also helps to control emissions and reduce noise from engine 26 by damping the sound waves produced during combustion.

It should be appreciated that snowmobile 10 is merely illustrative of a variety of vehicles that can implement the illustrative embodiments disclosed herein. Other vehicle implementations can include motorcycles, snow bikes, all-terrain vehicles (ATVs), utility vehicles, recreational vehicles, scooters, automobiles, mopeds, straddle-type vehicles, jet skis and the like. As such, those skilled in the art will recognize that the illustrative embodiments disclosed herein can be integrated into a variety of vehicle configurations. It should be appreciated that even though ground-based vehicles are particularly well-suited to implement the embodiments of the present disclosure, airborne vehicles and devices such as aircraft can also implement the embodiments.

Figure 3A:
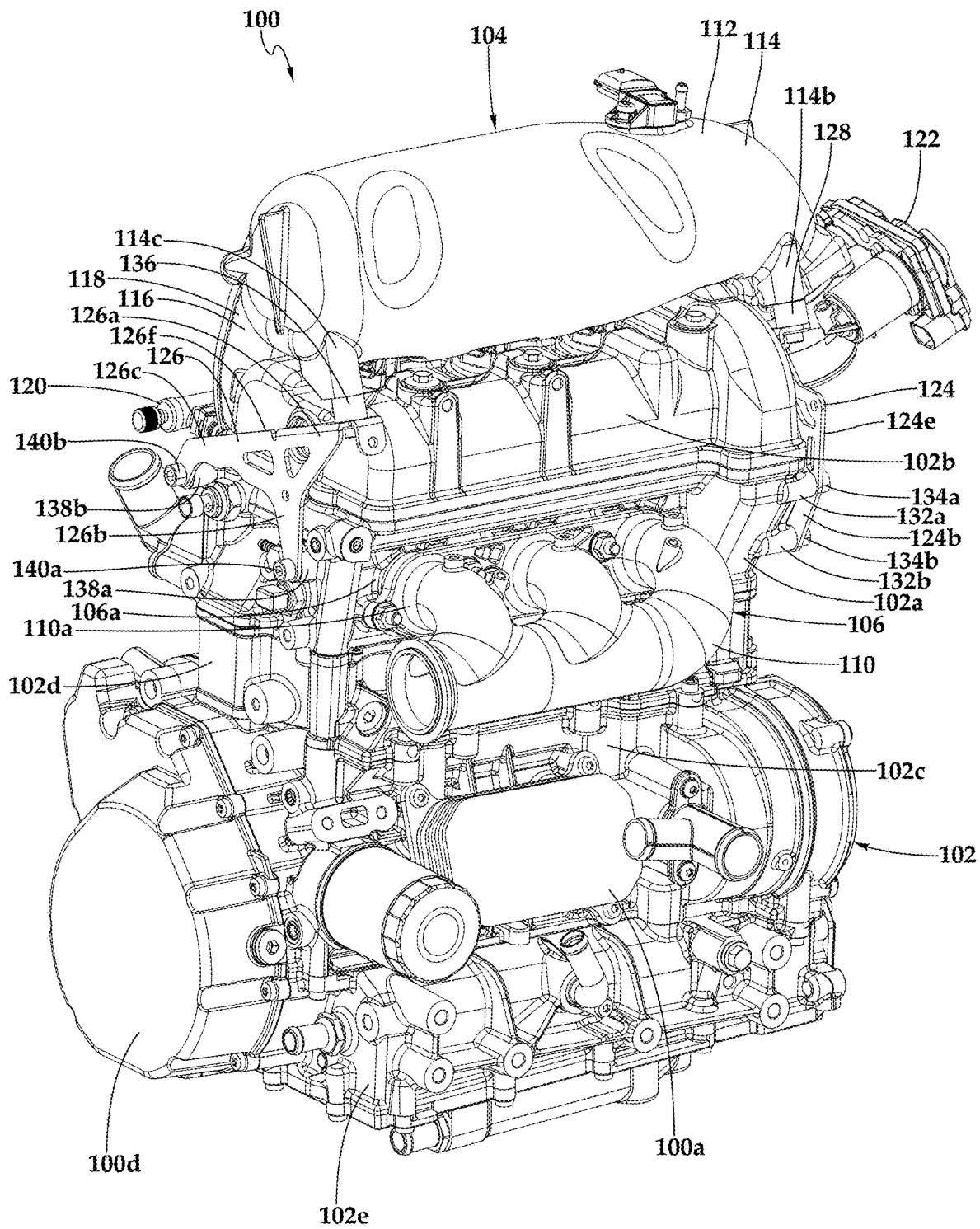
FIGS. 3A-3F are various views of a snowmobile engine including an engine body assembly and an air intake manifold mounted thereto using air plenum support brackets, isolation cuffs and other vibration isolation elements in accordance with embodiments of the present disclosure.
Figure 3B:
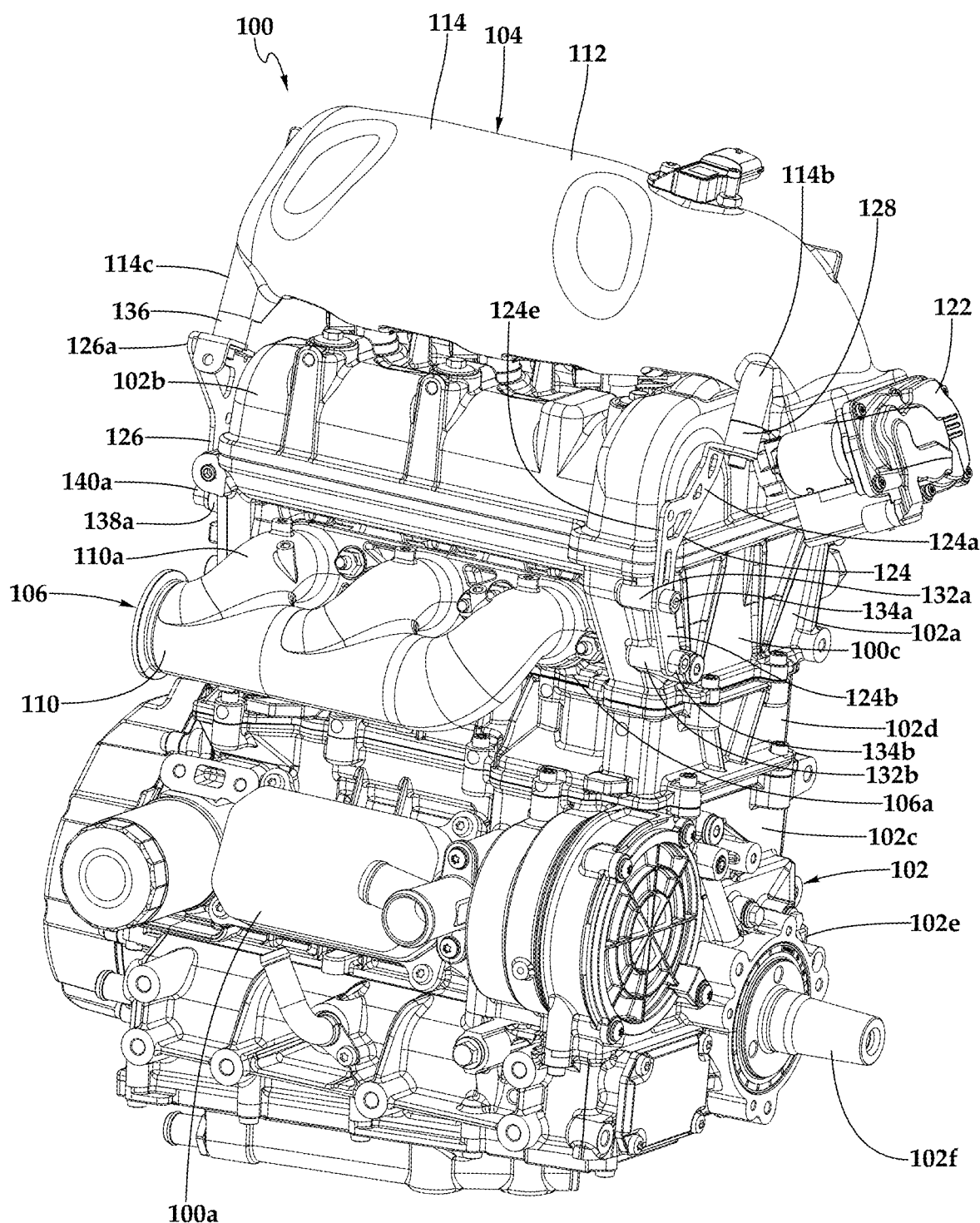
Figure 3C:
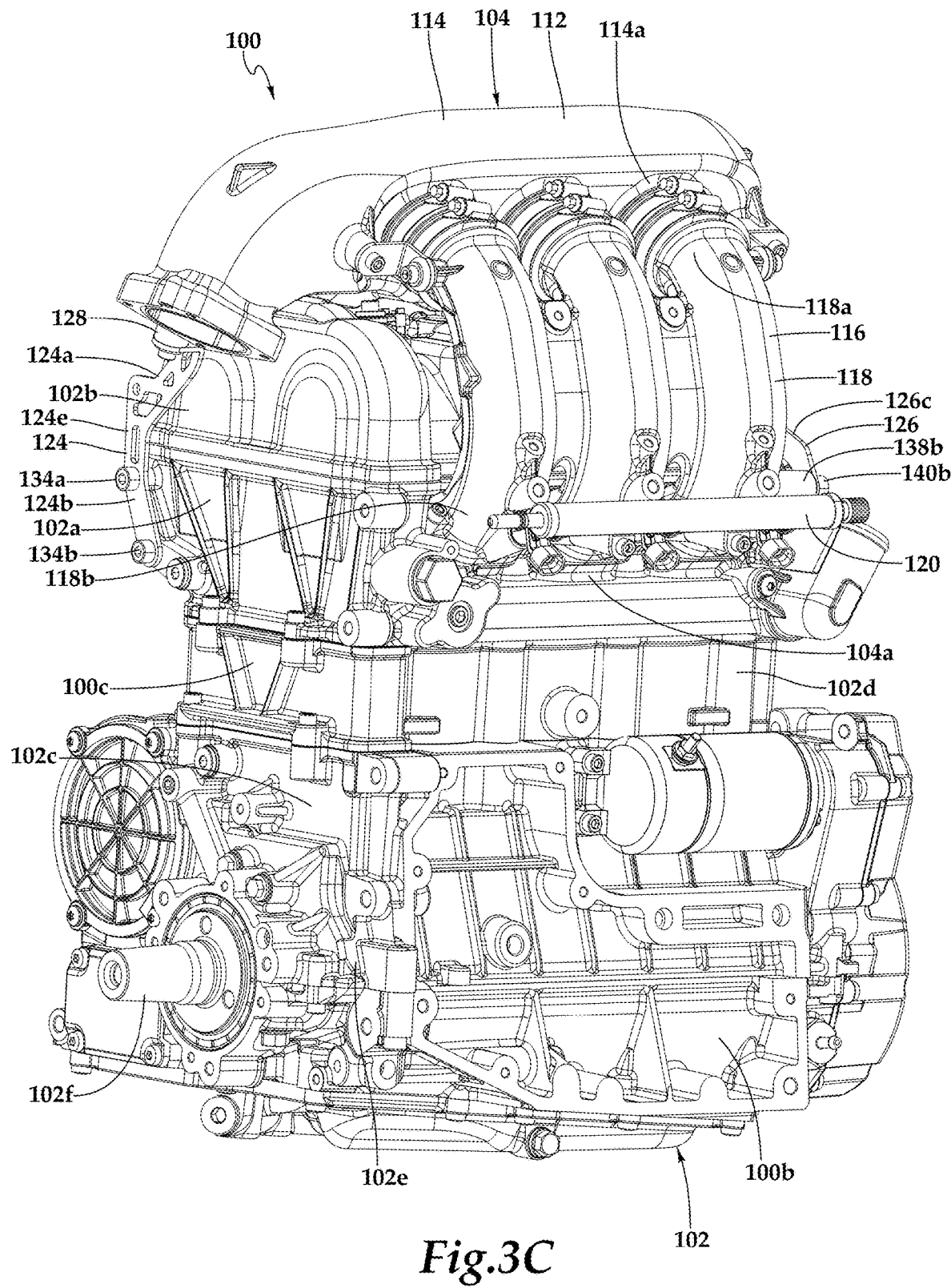
Figure 3D:
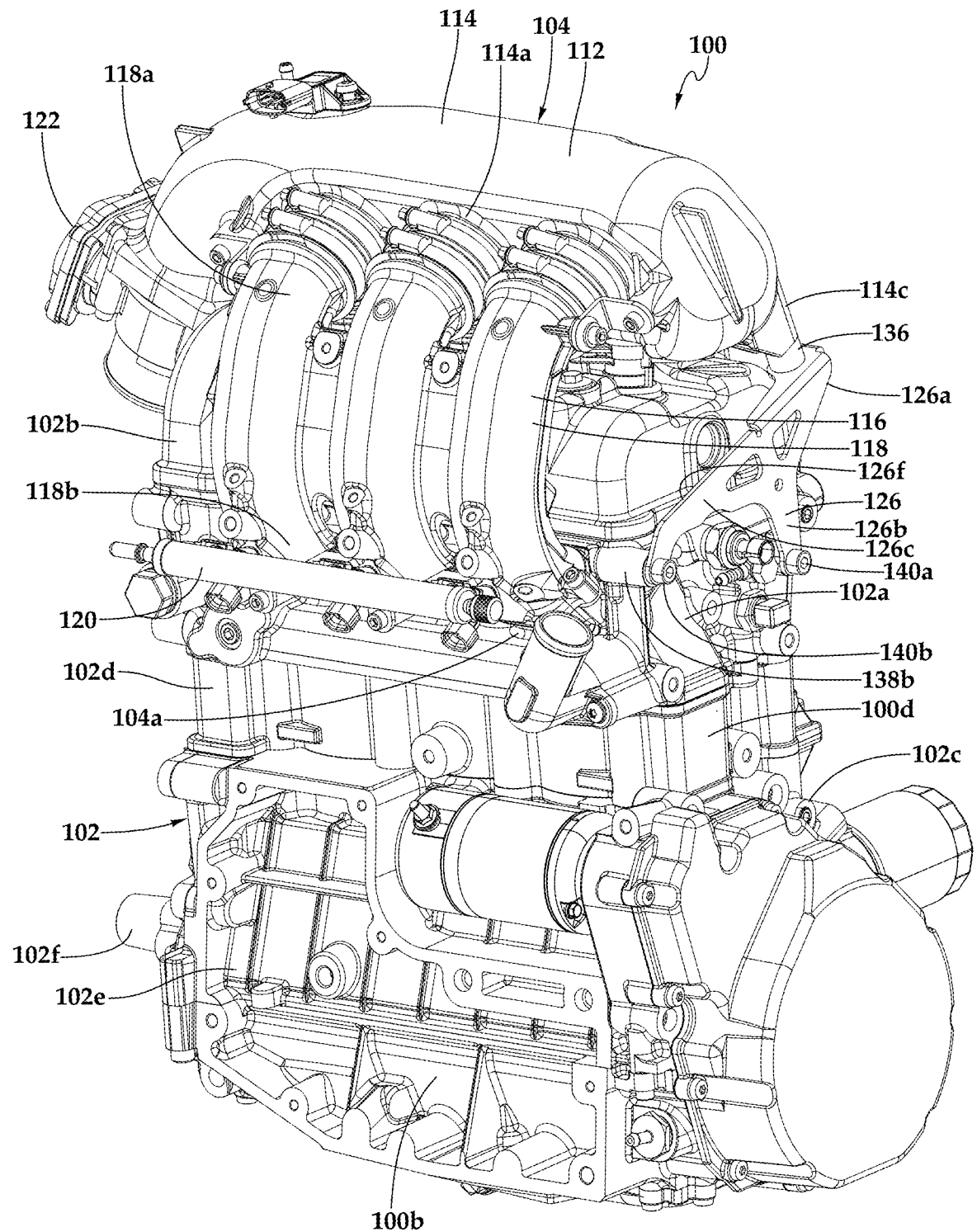
Figure 3E:
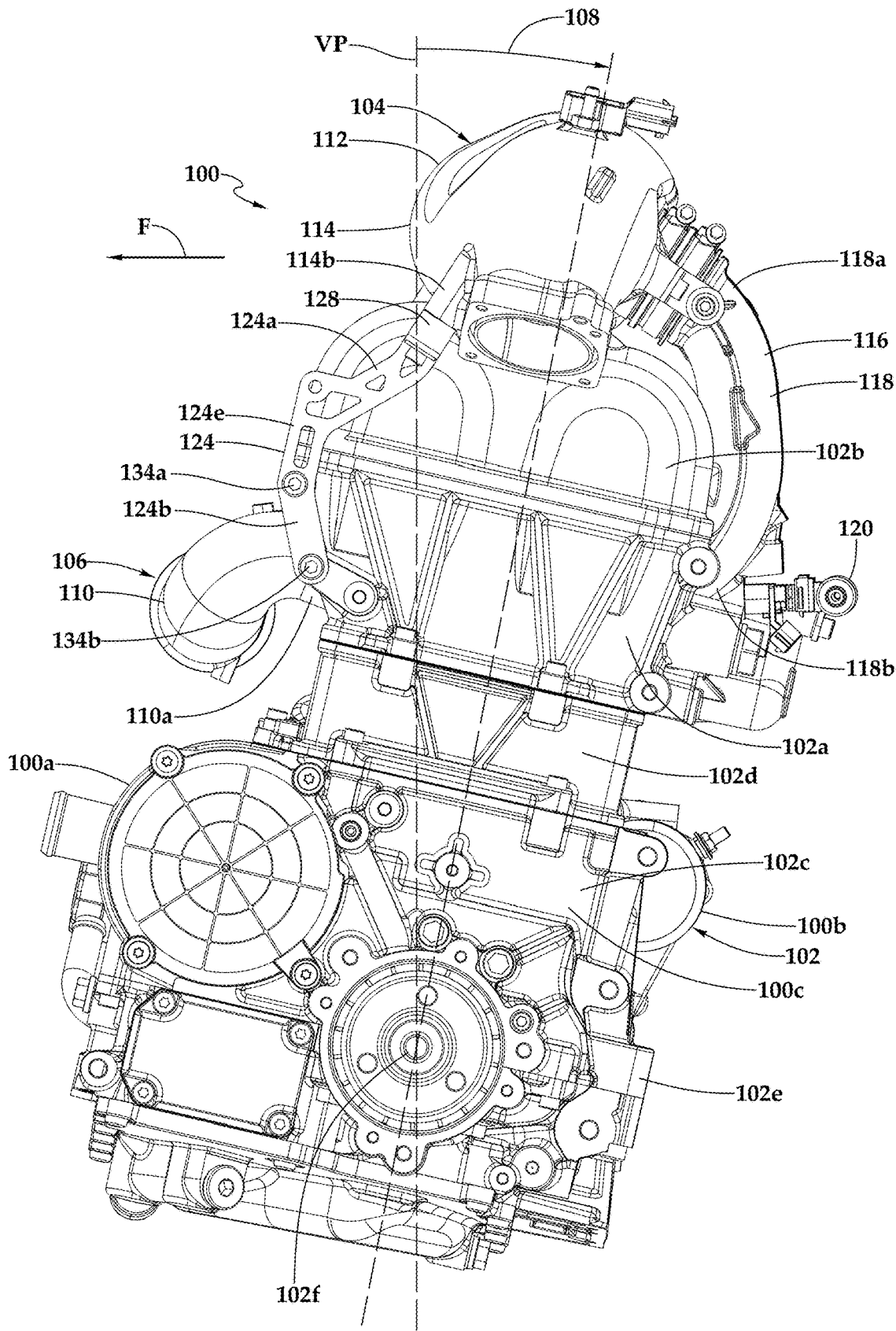
Figure 3F:
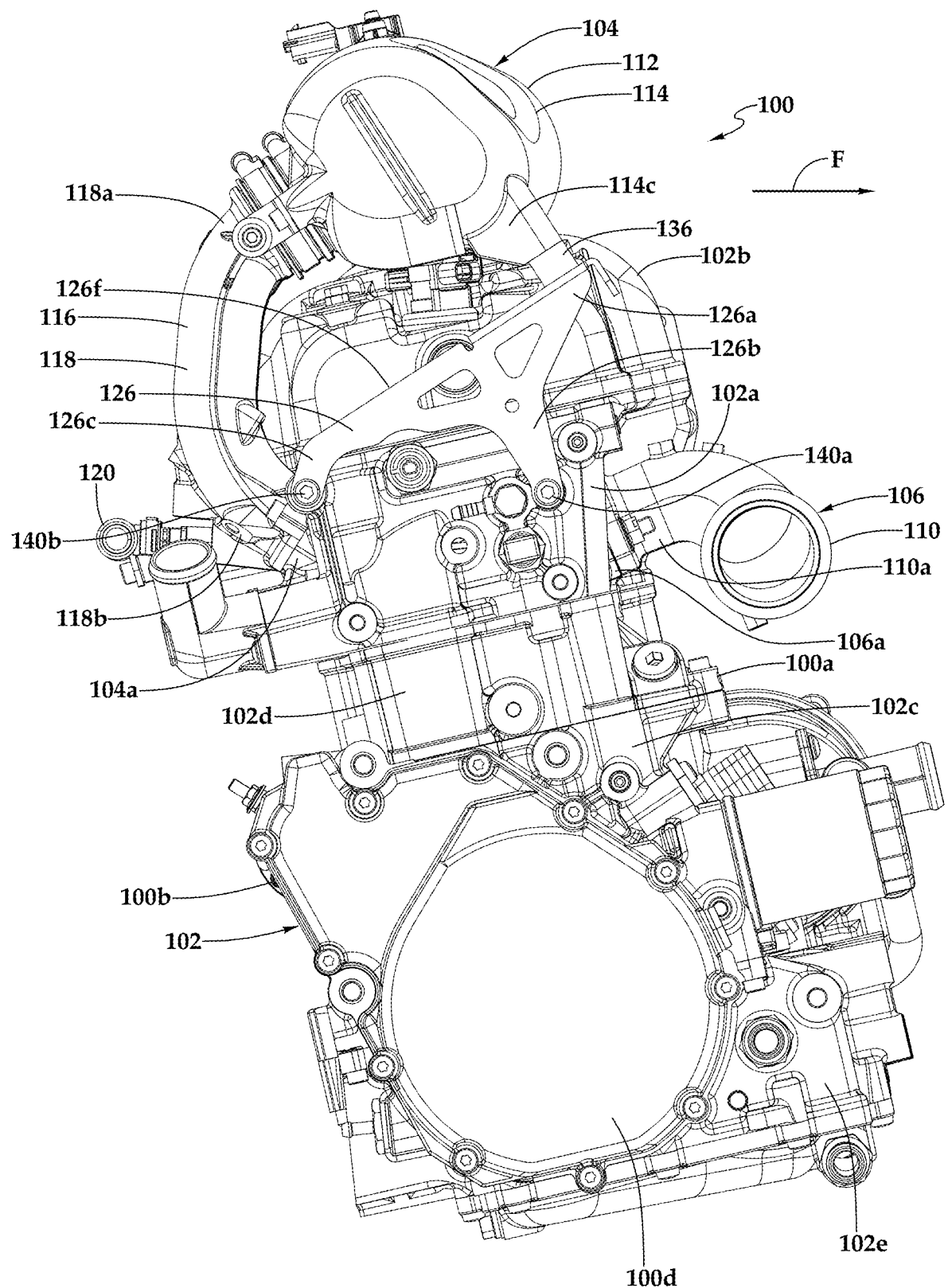

Referring to FIGS. 3A-3F in the drawings, an engine 100 including engine body assembly 102 and certain components of air intake system 104 and exhaust system 106 is schematically illustrated. Engine 100 is a non-limiting example of engine 26 shown in FIGS. 2A-2B. As compared to engine 26, certain components of engine 100 such as turbocharger 30, airbox 82b, air filter 82c, intercooler 86, intake conduit 88, exhaust duct 90 and muffler 92 have been removed to reveal underlying componentry. It should be appreciated, however, that engine 100 may be either a turbocharged or naturally aspirated engine. Engine 100 has a forward side 100a, an aft side 100b and lateral sides including a left side 100c and a right side 100d, with the forward direction of the vehicle indicated by forward arrow F in FIGS. 3E-3F. In the illustrated embodiment, forward side 100a of engine 100 is considered to be the hot side of engine 100 due to the hot temperatures associated with engine exhaust. Aft side 100b of engine 100 is the intake side of engine 100 in which fresh air enters engine body assembly 102. The aft, intake side of engine 100 may also be considered the cool side of engine 100 as the hot exhaust system components are located opposite and/or remote therefrom. It should be appreciated, however, that the intake and exhaust sides of engine 100 may be located anywhere on engine 100 depending on the vehicle configuration. As best seen in FIGS. 3E-3F, when engine 100 is installed within a snowmobile such as snowmobile 10, engine 100 has an aftward tilt angle relative to a vertical plane VP, as indicated by arrow 108, when the snowmobile is resting on a horizontal surface, as illustrated in FIGS. 1B-1C. In the illustrated embodiment, the aftward tilted angle is between five degrees and thirty degrees relative to vertical plane VP such as between ten degrees and twenty degrees relative to vertical plane VP. It should be understood by those having ordinary skill in the art that engine 100 could have other orientations including aftward tilted angles both less than five degrees and greater than thirty degrees relative to vertical plane VP, a vertical orientation or a forward tilted angle.

Engine body assembly 102 has a cylinder head 102a, a cylinder head cover 102b and an engine block 102c that includes a cylinder block 102d and a crankcase 102e which houses a crankshaft 102f. Forward side 100a of engine 100, and specifically the forward side of cylinder head 102a, includes a plurality of exhaust ports 106a through which high-temperature exhaust gases produced by the combustion of the air and fuel mixture are expelled. Exhaust system 106 includes an exhaust manifold 110 coupled to the forward side of cylinder head 102a with a number of exhaust inlets 110a that corresponds to the number of exhaust ports 106a on engine body assembly 102. Exhaust inlets 110a are each aligned with a respective exhaust port 106a to receive exhaust gas, which is then directed away from engine 100 by exhaust manifold 110. In the illustrated embodiment, the forward side of cylinder head 102a has three exhaust ports 106a and exhaust manifold 110 has three exhaust inlets 110a corresponding to three cylinders in engine body assembly 102. In embodiments with less than or more than three cylinders, the forward side of engine body assembly 102 would include a corresponding number of exhaust ports 106a and exhaust manifold 110 would include a corresponding number of exhaust inlets 110a.

Aft side 100b of engine 100, and specifically the aft side of cylinder head 102a, includes a plurality of intake ports 104a through which a compressed air and fuel mixture enters the cylinders of engine body assembly 102, with the number of intake ports 104a corresponding to the number of cylinders in engine body assembly 102. Air intake system 104 is coupled to engine body assembly 102 and includes an air intake manifold 112, which delivers compressed air to intake ports 104a. In turbocharged applications, air is routed to air intake manifold 112 from an air inlet, airbox and air filter such as air inlet 82a, airbox 82b and air filter 82c via a turbocharger such as turbocharger 30 in FIGS. 2A-2B. In naturally aspirated applications, air may be routed to air intake manifold 112 via an air inlet, airbox and/or air filter, without an interposed turbocharger. Air intake manifold 112 includes an air plenum 114 and an air runner assembly 116. Air plenum 114 is positioned above cylinder head cover 102b of engine body assembly 102. Air plenum 114 includes a plurality of air discharge ports 114a and may be configured to dampen air flow prior to distribution to the cylinders in engine body assembly 102. Air runner assembly 116 is downstream from air plenum 114 and coupled between air plenum 114 and engine body assembly 102. Air runner assembly 116 includes a plurality of air intake runners 118 that deliver compressed air from air discharge ports 114a of air plenum 114 to the cylinders of engine body assembly 102. The upstream end 118a of each air intake runner 118 defines an air inlet port aligned and in fluid communication with a respective one of air discharge ports 114a of air plenum 114. The downstream end of air runner assembly 116 is rigidly bolted or otherwise coupled to the aft side of cylinder head 102a such that the downstream end 118b of each air intake runner 118, which defines an air outlet, is aligned and in fluid communication with a respective one of intake ports 104a of cylinder head 102a. The air outlets at downstream ends 118b of air intake runners 118 are the air outlets of air intake system 104, at which point compressed air is delivered to the cylinders of engine body assembly 102 for combustion. In the illustrated embodiment, air plenum 114 has three air discharge ports 114a, air runner assembly 116 has three air intake runners 118 and the aft side of cylinder head 102a has three intake ports 104a corresponding to three cylinders in engine body assembly 102. In embodiments with less than or more than three cylinders, air plenum 114 would include a corresponding number of air discharge ports 114a, air runner assembly 116 would include a corresponding number of air intake runners 118 and the aft side of cylinder head 102a would include a corresponding number of intake ports 104a. Air plenum 114 may be made from metal, metal alloy, polymeric materials, fiber reinforced polymer composites and/or combinations thereof. Air runner assembly 116 including air intake runners 118 may be formed from the same or different material as compared to air plenum 114, and may be made from metal, metal alloy, polymeric materials, fiber reinforced polymer composites and/or combinations thereof. In turbocharged applications, air plenum 114 and/or air runner assembly 116 may be formed from stronger materials such as aluminum to withstand the higher air pressures produced by a turbocharger, while in naturally aspirated applications air plenum 114 and/or air runner assembly 116 may be formed from lighter weight materials such as plastic. In the illustrated embodiment, air plenum 114 and air runner assembly 116 are separate components coupled to one another, although in other embodiments air plenum 114 and air runner assembly 116 may be integral with one another to form air intake manifold 112. Fuel for engine 100 is supplied from a fuel tank via a fuel rail 120 that is coupled to the downstream end of air runner assembly 116 and may include a multi-point fuel injector system that is configured to inject fuel into each cylinder of engine body assembly 102 through downstream end 118b of each air intake runner 118. Downstream ends 118b of air intake runners 118 include mounting bosses for mounting fuel rail 120 and also each house a fuel injector.

Coupled to the upstream end of air plenum 114 is throttle body 122, which controls the amount of compressed air entering air intake manifold 112 and the cylinders of engine body assembly 102. Throttle body 122 includes a valve such as a butterfly valve that opens and closes to control the movement of compressed air therethrough in response to driver input. In some embodiments, engine 100 may implement a throttle-by-wire design in which an engine control unit (ECU) communicates throttle changes from the handlebar or other accelerator location to throttle body 122, with the ECU controlling or modulating the throttle signal based on a set of operational parameters. In such implementations, the ECU may control a number of engine operations including throttle body 122 and fuel delivery from a fuel tank via a fuel pump. Certain components of air intake system 104 may be susceptible to vibrations such as those emanating from engine body assembly 102 including cylinder head 102a. For example, throttle body 122 may contain electronics susceptible to impairment or damage when shaken. Other components coupled to air intake system 104 may also be sensitive to vibrations. Previous air intake systems have been rigidly or hard mounted onto the engine body, causing vibrations emanating from the engine body to rattle and potentially damage the air intake system including any sensitive components coupled thereto. Some designs have attempted to overcome this problem by mounting the throttle body directly to the engine body with a soft component interposed therebetween. However, such designs are often considered impractical or undesirable due to spatial, efficiency and other factors. To address these and other issues, engine 100 includes a number of vibration isolating devices that non-rigidly couple air plenum 114 to both engine body assembly 102 and air runner assembly 116 to isolate air plenum 114 and components secured thereto such as throttle body 122 from the harsh vibrations of engine body assembly 102. By decoupling throttle body 122 from the vibrations of engine body assembly 102, the electronics housed within throttle body 122 are protected from damage.

Figure 5A:
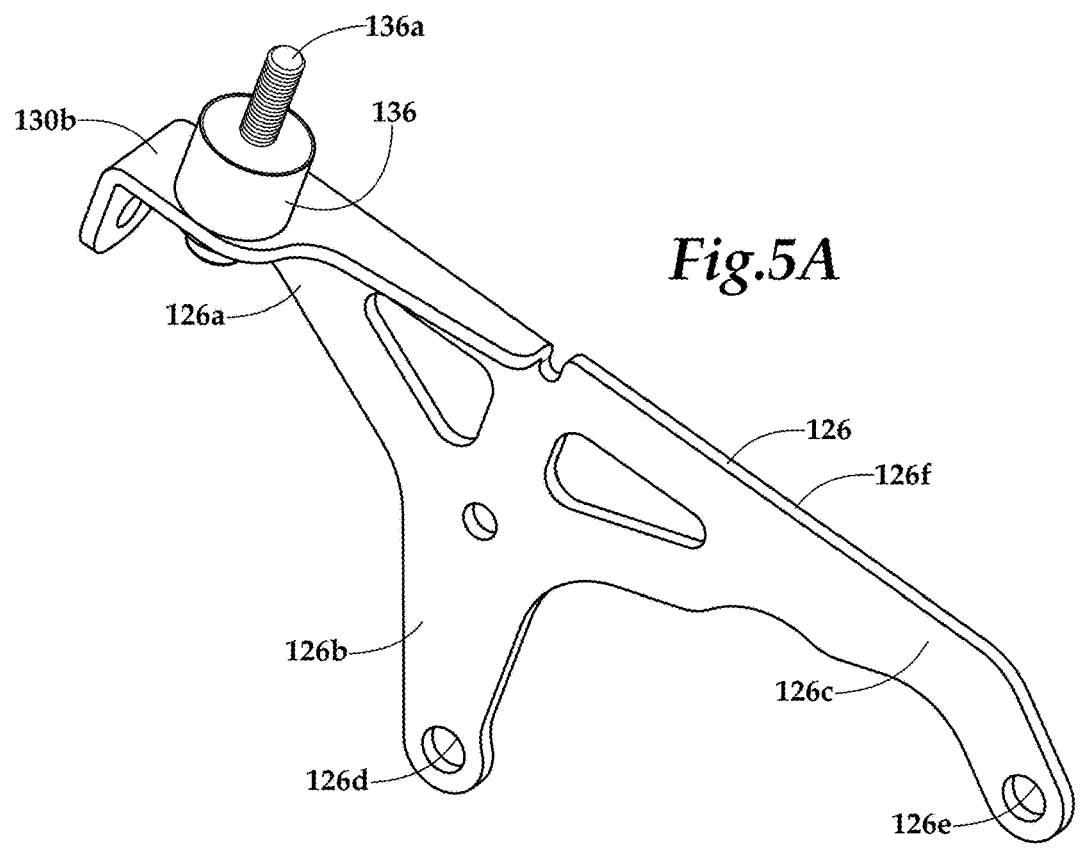
FIGS. 5A-5B are various views of a right air plenum support bracket in accordance with embodiments of the present disclosure.
Figure 5B:
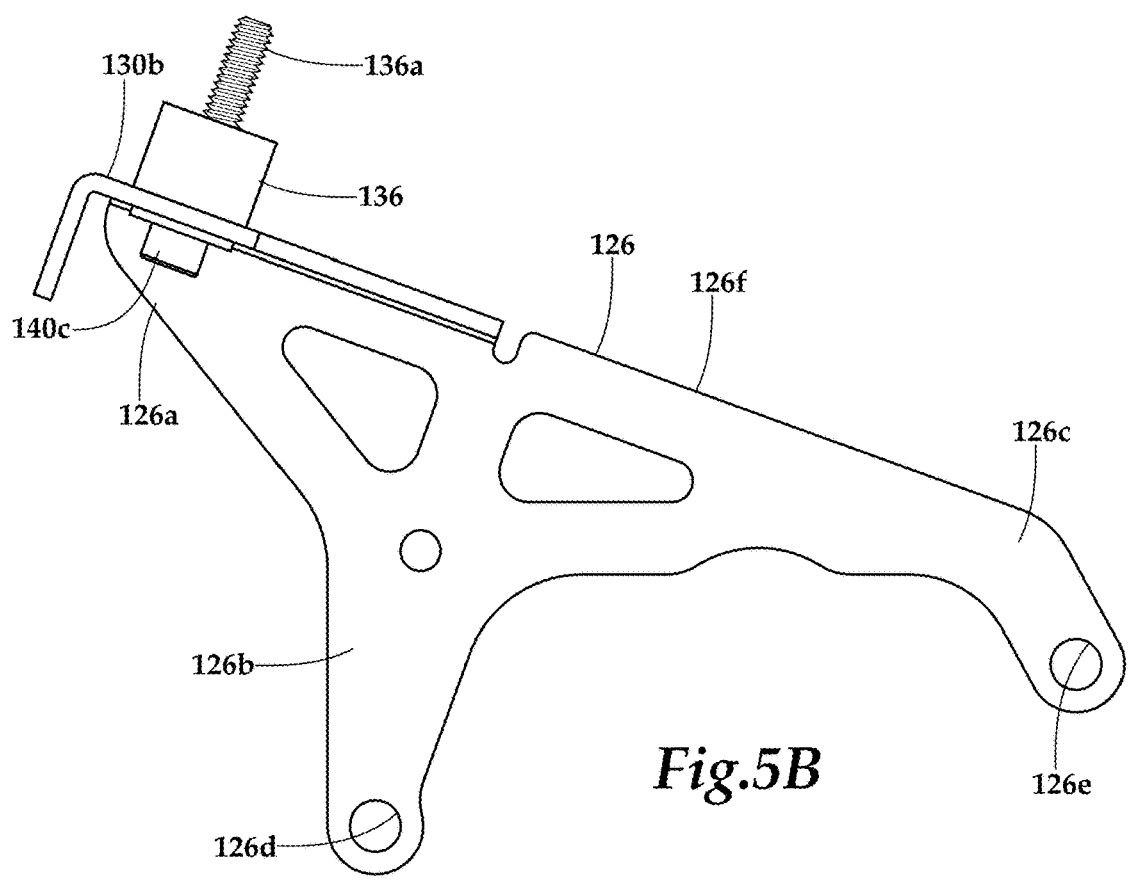

Referring additionally to FIGS. 4A-4C and 5A-5B in the drawings, engine 100 includes a left air plenum support bracket 124 shown in FIGS. 4A-4C and a right air plenum support bracket 126 shown in FIGS. 5A-5B. Air plenum support brackets 124, 126 couple air plenum 114 to the lateral sides of engine body assembly 102. In particular, left air plenum support bracket 124 couples the left side of air plenum 114 to the left side of engine body assembly 102 and right air plenum support bracket 126 couples the right side of air plenum 114 to the right side of engine body assembly 102. Left air plenum support bracket 124 has an upper arm 124a coupled to the underside of air plenum 114 via a vibration isolator 128. A forward portion of the underside of air plenum 114 includes a raised boss 114b that receives a rod 128a, such as a threaded rod, defined by the top side of vibration isolator 128 to secure vibration isolator 128 to air plenum 114. Upper arm 124a of left air plenum support bracket 124 defines a vibration isolator support platform 130a that supports vibration isolator 128 such that vibration isolator 128 is interposed between vibration isolator support platform 130a and air plenum 114. Left air plenum support bracket 124 has a lower arm 124b coupled to the left side of engine body assembly 102, and in particular to raised upper and lower bosses 132a, 132b on the left side of cylinder head 102a. A fastener 134a is inserted through an upper fastener hole 124c defined by lower arm 124b of left air plenum support bracket 124 and upper boss 132a on the forward-left side of cylinder head 102a, and a fastener 134b is inserted through a lower fastener hole 124d defined by lower arm 124b of left air plenum support bracket 124 and lower boss 132b on the forward-left side of cylinder head 102a to secure lower arm 124b of left air plenum support bracket 124 to engine body assembly 102. It should be appreciated that although vibration isolator 128 is interposed between air plenum 114 and upper arm 124a of left air plenum support bracket 124, in other embodiments vibration isolator 128 may be coupled to any portion of left air plenum support bracket 124 and interposed anywhere between air plenum 114 and engine body assembly 102. For example, vibration isolator 128 may be interposed between lower arm 124b of left air plenum support bracket 124 and engine body assembly 102 such that lower arm 124b of left air plenum support bracket 124 is coupled to engine body assembly 102 via vibration isolator 128. In another non-limiting example, two or more vibration isolators may be utilized to couple left air plenum support bracket 124 wherein upper arm 124a of left air plenum support bracket 124 is coupled to air plenum 114 via a first vibration isolator and lower arm 124b of left air plenum support bracket 124 is coupled to engine body assembly 102 via a second vibration isolator. Upper arm 124a and lower arm 124b are both sloped sections of left air plenum support bracket 124 that slope aftward from a vertical section 124e of left air plenum support bracket 124 interposed between upper and lower arms 124a, 124b.

Right air plenum support bracket 126 has an upper arm 126a coupled to the underside of air plenum 114 via a vibration isolator 136. A forward portion of the underside of air plenum 114 includes a raised boss 114c that receives a rod 136a, such as a threaded rod, defined by the top side of vibration isolator 136 to secure vibration isolator 136 to air plenum 114. Upper arm 126a of right air plenum support bracket 126 defines a vibration isolator support platform 130b that supports vibration isolator 136 such that vibration isolator 136 is interposed between vibration isolator support platform 130b and air plenum 114. In contrast to left air plenum support bracket 124, the lower arm of right air plenum support bracket 126 bifurcates into a forward lower arm 126b and an aft lower arm 126c, which are coupled to the right side of engine body assembly 102, and in particular to raised forward and aft bosses 138a, 138b on the right side of cylinder head 102a. A fastener 140a is inserted through a forward fastener hole 126d defined by forward lower arm 126b of right air plenum support bracket 126 and forward boss 138a on the forward-right side of cylinder head 102a, and a fastener 140b is inserted through an aft fastener hole 126e defined by aft lower arm 126c of right air plenum support bracket 126 and aft boss 138b on the aft-right side of cylinder head 102a to secure forward and aft lower arms 126b, 126c of right air plenum support bracket 126 to engine body assembly 102. It should be appreciated that although vibration isolator 136 is interposed between air plenum 114 and upper arm 126a of right air plenum support bracket 126, in other embodiments vibration isolator 136 may be coupled to any portion of right air plenum support bracket 126 and interposed anywhere between air plenum 114 and engine body assembly 102. For example, vibration isolator 136 may be interposed between forward lower arm 126b of right air plenum support bracket 126 and engine body assembly 102 such that forward lower arm 126b is coupled to engine body assembly 102 via vibration isolator 136. Alternatively or additionally, a vibration isolator may be interposed between aft lower arm 126c of right air plenum support bracket 126 and engine body assembly 102 such that aft lower arm 126c is coupled to engine body assembly 102 via a vibration isolator. In another non-limiting example, three or more vibration isolators may be utilized to couple right air plenum support bracket 126 wherein upper arm 126a of right air plenum support bracket 126 is coupled to air plenum 114 via a first vibration isolator, forward lower arm 126b of right air plenum support bracket 126 is coupled to engine body assembly 102 via a second vibration isolator and aft lower arm 126c of right air plenum support bracket 126 is coupled to engine body assembly 102 via a third vibration isolator. Upper arm 126a and aft lower arm 126c are each partially defined by a shared top edge 126f of right air plenum support bracket 126. Left and right air plenum support brackets 124, 126 are nonuniformly shaped, with left air plenum support bracket 124 having a single upper arm 124a and a single lower arm 124b and right air plenum support bracket 126 having a single upper arm 126a and two lower arms 126b, 126c. In other embodiments, however, left and right air plenum support brackets 124, 126 may have the same shape. Also, each air plenum support bracket 124, 126 may have any number of upper and lower arms in any combination or ratio such as an upper arm to lower arm ratio of 2:1, 2:2, 1:3, 3:1, 2:3, 3:2, 3:3 as well as other ratios. Left and right air plenum support brackets 124, 126 may be made from metal, metal alloy, polymeric materials, fiber reinforced polymer composites, any rigid material and/or combinations thereof. For example, left and right air plenum support brackets 124, 126 may be formed from steel or aluminum.

Referring additionally to FIGS. 6A-6B in the drawings, the coupling of right air plenum support bracket 126 to air plenum 114 via vibration isolator 136 is shown. The coupling between right air plenum support bracket 126 and air plenum 114 via vibration isolator 136 is substantially similar to the coupling between left air plenum support bracket 124 and air plenum 114 via vibration isolator 128 therefore, for sake of efficiency, certain features will be disclosed only with regard to the coupling between right air plenum support bracket 126 and air plenum 114 via vibration isolator 136. One having ordinary skill in the art, however, will fully appreciate an understanding of the coupling between left air plenum support bracket 124 and air plenum 114 via vibration isolator 128 based upon the disclosure herein of the coupling between right air plenum support bracket 126 and air plenum 114 via vibration isolator 136. The top side of vibration isolator 136 defines rod 136a such as a metal rod, which is received by boss 114c to secure vibration isolator 136 to air plenum 114. Rod 136a may have external threads and boss 114c may have internal threads to form a threaded connection. The underside of vibration isolator 136 defines a fastener hole 136b and vibration isolator support platform 130b on upper arm 126a of right air plenum support bracket 126 defines a fastener hole 126g. A fastener 140c is inserted through fastener hole 126g of upper arm 126a and received by fastener hole 136b on the underside of vibration isolator 136 to secure upper arm 126a to vibration isolator 136. Fastener 140c may have external threads and fastener hole 136b may have internal threads to form a threaded connection. The body of each vibration isolator 128, 136 is substantially cylindrical and formed from an elastomeric material such as rubber that is adapted to absorb shocks and other vibrations. By interposing vibration isolators 128, 136 between air plenum support brackets 124, 126 and air plenum 114, the transfer of vibration from engine body assembly 102 to air plenum 114 is inhibited, thus reducing the vibrations experienced by air plenum 114 and components attached thereto such as throttle body 122 during operation. Vibration isolators 128, 136, being elastic in nature, also compensate for part tolerances and differential heat expansion.

Figure 7A:
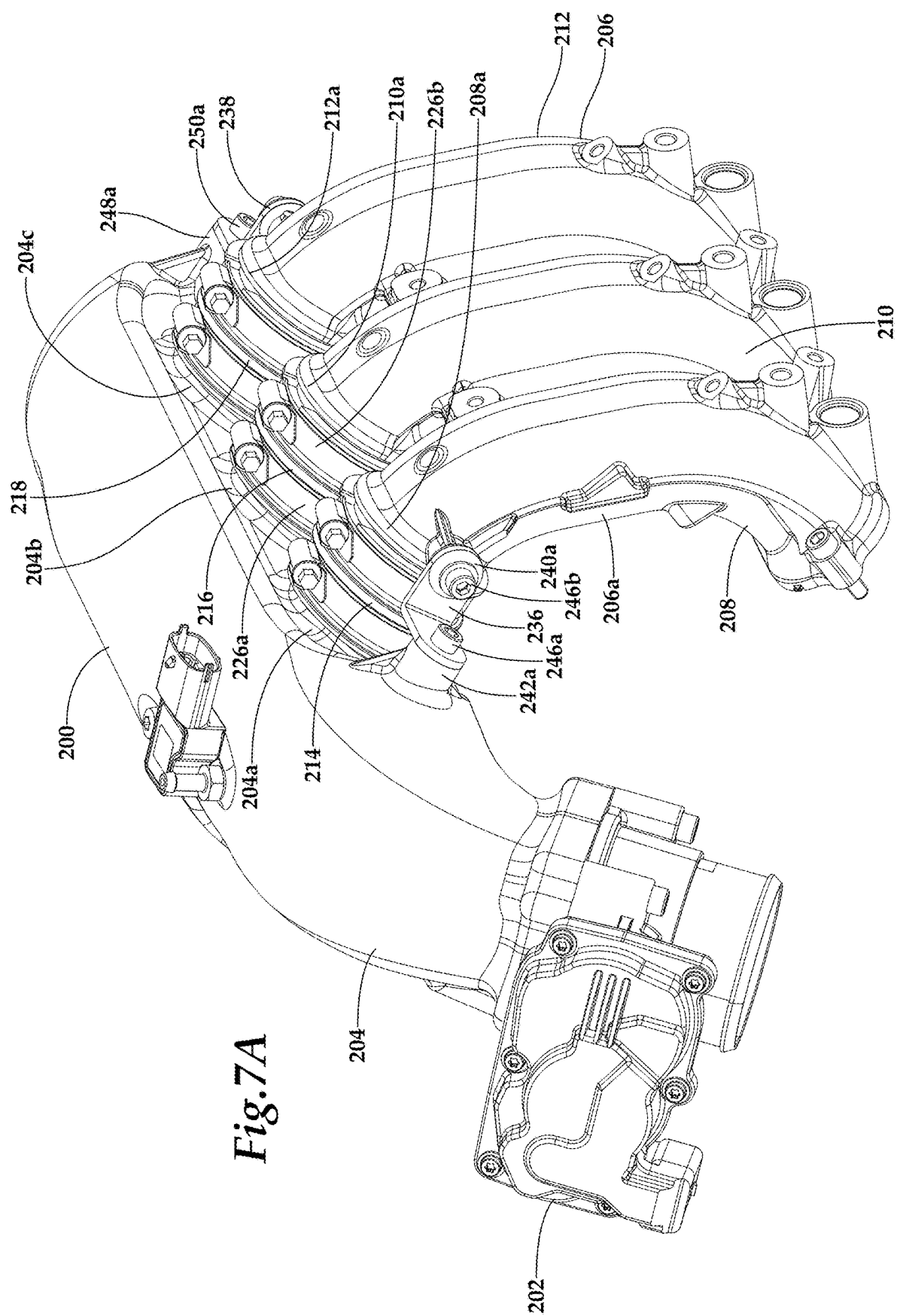
FIGS. 7A-7B are various views of a throttle body and an air intake manifold including isolation cuffs and brackets in accordance with embodiments of the present disclosure.
Figure 7B:
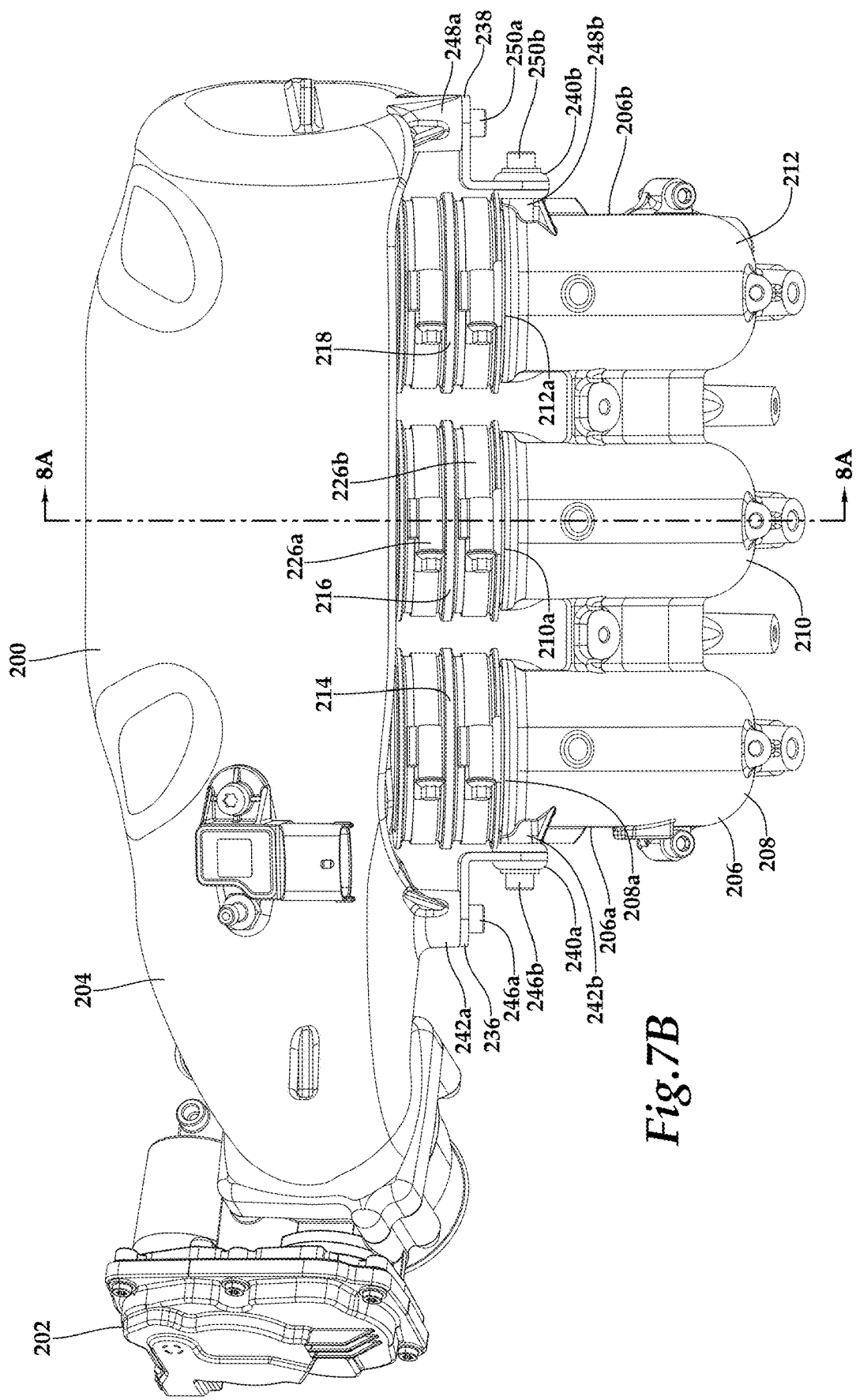

Referring to FIGS. 7A-7B in the drawings, additional views of air intake manifold 112 and throttle body 122 in FIGS. 3A-3F are schematically illustrated as air intake manifold 200 and throttle body 202. Air intake manifold 200 includes air plenum 204 and air runner assembly 206. Air plenum 204 includes left air discharge port 204a, center air discharge port 204b and right air discharge port 204c. Air runner assembly 206 includes left air intake runner 208, center air intake runner 210 and right air intake runner 212. The upstream end of left air intake runner 208 defines air inlet port 208a that receives compressed air from left air discharge port 204a of air plenum 204, the upstream end of center air intake runner 210 defines air inlet port 210a that receives compressed air from center air discharge port 204b of air plenum 204 and the upstream end of right air intake runner 212 defines air inlet port 212a that receives compressed air from right air discharge port 204c of air plenum 204. Air plenum 204 and air runner assembly 206 of air intake manifold 200 are separate components. Because the downstream, lower end of air runner assembly 206 is rigidly mounted to engine body assembly 102 in FIGS. 3A-3F, vibrations are readily transferred from engine body assembly 102 to air runner assembly 206. To inhibit engine vibrations from transferring to air plenum 204 via air runner assembly 206, isolations cuffs, or couplings, 214, 216, 218 are interposed between air plenum 204 and air runner assembly 206. More specifically, left isolation cuff 214 is interposed between left air discharge port 204a of air plenum 204 and air inlet port 208a of left air intake runner 208 to provide fluid communication and vibration isolation therebetween, center isolation cuff 216 is interposed between center air discharge port 204b of air plenum 204 and air inlet port 210a of center air intake runner 210 to provide fluid communication and vibration isolation therebetween and right isolation cuff 218 is interposed between right air discharge port 204c of air plenum 204 and air inlet port 212a of right air intake runner 212 to provide fluid communication and vibration isolation therebetween. In the illustrated embodiment, air intake manifold 200 includes three air discharge ports 204a, 204c, 204c, three air intake runners 208, 210, 212 and three isolation cuffs 214, 216, 218. However, the number of air discharge ports, air intake runners and isolation cuffs may vary depending on the number of engine cylinders to which air is provided.

Figure 8A:
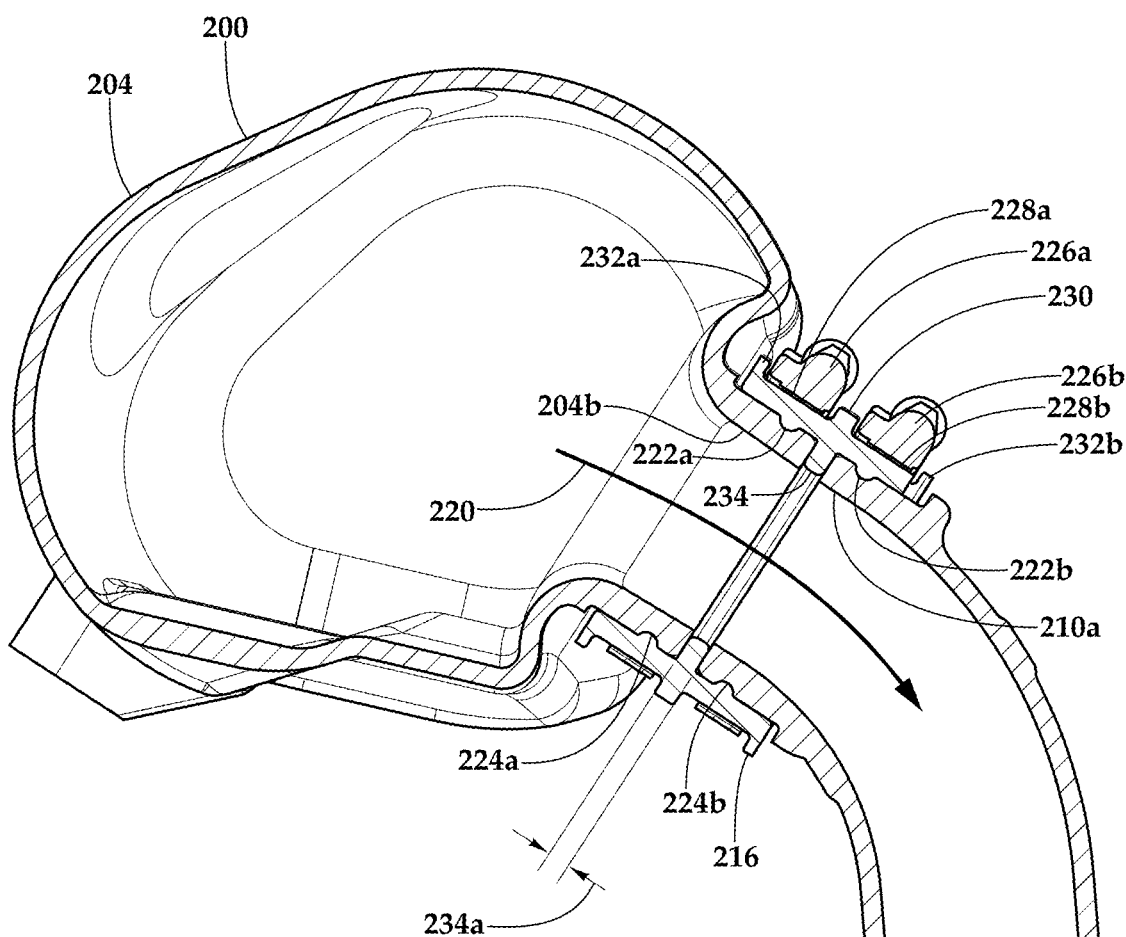
FIGS. 8A-8C are various views of an isolation cuff in accordance with embodiments of the present disclosure.
Figure 8C:
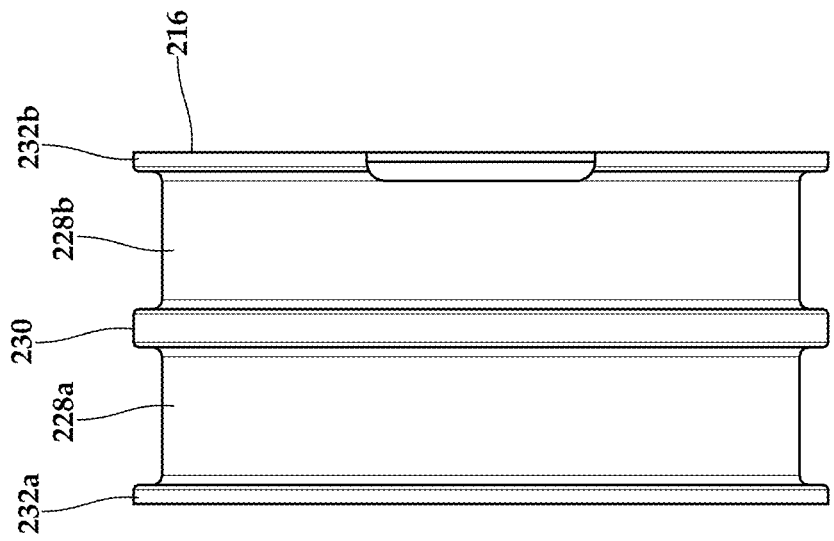
Figure 8B:
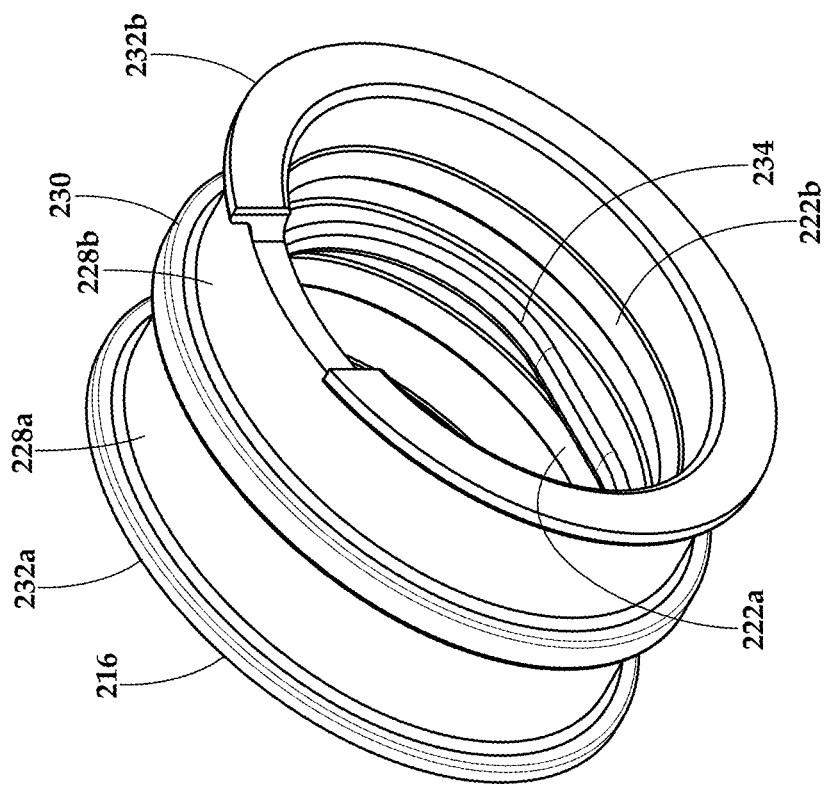

Referring additionally to FIGS. 8A-8C in the drawings, various views of center isolation cuff 216 are shown including a cross-sectional view taken along line 8A-8A in FIG. 7B of the coupling of air discharge port 204b of air plenum 204 to air inlet port 210a of center air intake runner 210 via center isolation cuff 216. Center isolation cuff 216 is substantially similar to left isolation cuff 214 and right isolation cuff 218 therefore, for sake of efficiency, certain features will be disclosed only with regard to center isolation cuff 216. One having ordinary skill in the art, however, will fully appreciate an understanding of left isolation cuff 214 and right isolation cuff 218 based upon the disclosure herein of center isolation cuff 216. Arrow 220 in FIG. 8A shows the direction of airflow from air plenum 204 to air runner assembly 206 within air intake manifold 200. The upstream end of center isolation cuff 216 is coupled to air discharge port 204b of air plenum 204 and the downstream end of center isolation cuff 216 is coupled to air inlet port 210a of center air intake runner 210. To aid in the positioning of center isolation cuff 216 relative to air discharge port 204b and air inlet port 210a, the internal surface of center isolation cuff 216 defines upstream annular positioning ridge 222a and downstream annular positioning ridge 222b. As used herein, the term "annular" includes circular, oval, elliptical as well as other closed-loop shapes. The external surface of air discharge port 204b defines an annular groove 224a that receives upstream positioning ridge 222a to securely position air discharge port 204b relative to center isolation cuff 216. Similarly, the external surface of air inlet port 210a defines an annular groove 224b that receives downstream positioning ridge 222b to securely position air inlet port 210a relative to center isolation cuff 216. During both assembly and operation, annular positioning ridges 222a, 222b and annular grooves 224a, 224b assist in holding center isolation cuff 216 in place relative to air discharge port 204b and air inlet port 210a, thereby preventing air discharge port 204b and air inlet port 210a from being dislodged from center isolation cuff 216. Annular positioning ridges 222a, 222b and annular grooves 224a, 224b also help to provide a more secure seal between center isolation cuff 216 and air discharge port 204b and air inlet port 210a to prevent air leakage therebetween. While in the illustrated embodiment, the internal surface of center isolation cuff 216 forms annular positioning ridges 222a, 222b and the external surfaces of air discharge port 204b and air inlet port 210a form annular grooves 224a, 224b, in other embodiments the internal surface of center isolation cuff 216 may form annular grooves 224a, 224b and the external surfaces of air discharge port 204b and air inlet port 210a may form annular positioning ridges 222a, 222b.

To further secure center isolation cuff 216 to air discharge port 204b and air inlet port 210a and to prevent the disconnection of center isolation cuff 216 from air discharge port 204b and air inlet port 210a, air intake manifold 200 also includes upstream and downstream hose clamps 226a, 226b. Upstream hose clamp 226a is received by an upstream clamp groove 228a defined on the external surface of center isolation cuff 216. Upstream hose clamp 226a secures the upstream end of center isolation cuff 216 to air discharge port 204b of air plenum 204. Upstream hose clamp 226a surrounds upstream annular positioning ridge 222a and annular groove 224a to further tighten the seal provided by upstream annular positioning ridge 222a and annular groove 224a. Downstream hose clamp 226b is received by a downstream clamp groove 228b defined on the external surface of center isolation cuff 216. Downstream hose clamp 226b secures the downstream end of center isolation cuff 216 to air inlet port 210a of center air intake runner 210. Downstream hose clamp 226b surrounds downstream annular positioning ridge 222b and annular groove 224b to further tighten the seal provided by downstream annular positioning ridge 222b and annular groove 224b. Clamp grooves 228a, 228b are separated by an annular divider 230 on the external surface of center isolation cuff 216, while the upstream edge of clamp groove 228a is bounded by an upstream ridge 232a on the external surface of center isolation cuff 216 and the downstream edge of clamp groove 228b is bounded by a downstream ridge 232b on the external surface of center isolation cuff 216. The internal surface of center isolation cuff 216 defines an annular internal divider 234 interposed between air discharge port 204b and air inlet port 210a. Internal divider 234 ensures that there is no direct contact or touching between air discharge port 204b and air inlet port 210a so that no vibration is transferred from center air intake runner 210 to air plenum 204. Internal divider 234 has an upstream to downstream depth 234a to inhibit vibration transfer from center air intake runner 210 to air plenum 204 such as a depth 234a in a range between one millimeter and thirty millimeters including a range between five millimeters and six millimeters. Center isolation cuff 216 is annular in shape, which encompasses circular, oval, elliptical as well as other closed-loop shapes. Center isolation cuff 216 is illustrated as a monolithic, or integral, component, although in other embodiments center isolation cuff 216 may be formed from separate components. Center isolation cuff 216 is made from an elastomeric material such as rubber that is adapted to absorb shocks and other vibrations. Isolation cuffs 214, 216, 218 inhibit vibrations from engine body assembly 102 in FIGS. 3A-3F from being transferred to air plenum 204 via air runner assembly 206, thereby protecting components attached to air plenum 204 such as throttle body 202. In addition, the interposition of isolation cuffs 214, 216, 218 between air plenum 204 and air runner assembly 206 allows air plenum 204 to be easily disconnected from the engine so that the underlying engine body assembly 102 including any sparkplugs at cylinder head cover 102b can be more conveniently accessed for service without removing components of the fuel system. Isolation cuffs 214, 216, 218, being elastic in nature, also compensate for part tolerances and differential heat expansion. Additionally or alternatively, a vibration isolator may be interposed between throttle body 202 and air plenum 204 to inhibit air plenum vibrations from transferring to throttle body 202.

Referring back to FIGS. 7A-7B in the drawings, air intake manifold 200 includes left bracket 236 and right bracket 238 to buttress the connection between air plenum 204 and air runner assembly 206. In turbocharged applications, air plenum 204 and air runner assembly 206 contain elevated air pressures as compared to naturally aspirated applications, increasing the risk that air plenum 204 and air runner assembly 206 may separate during operation. While isolation cuffs 214, 216, 218 provide a strong and reliable connection between air plenum 204 and air runner assembly 206, brackets 236, 238 provide a reinforcing connection that ensures smooth operation of air intake manifold 200. It should be appreciated that isolation cuffs 214, 216, 218 and brackets 236, 238 may be utilized in either turbocharged or naturally aspirated applications, and that air intake manifold 200 may include either or both of isolation cuffs 214, 216, 218 and/or brackets 236, 238. Air runner assembly 206 has lateral sides including a left side 206a and a right side 206b.

Figure 9A:
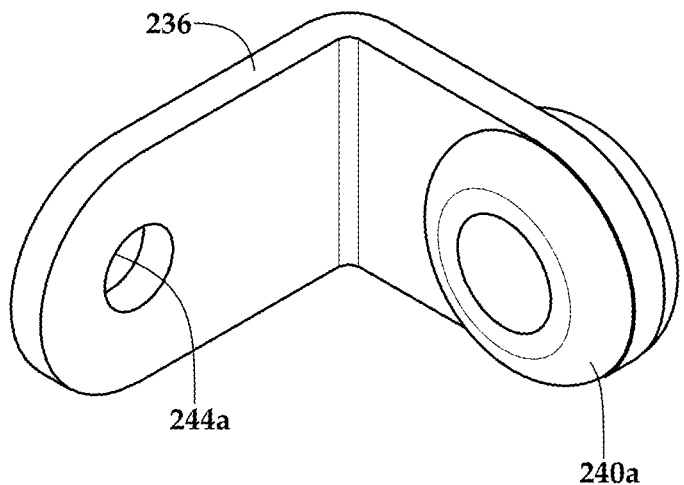
FIGS. 9A-9C are various views of a bracket including a vibration isolator in accordance with embodiments of the present disclosure.
Figure 9B:
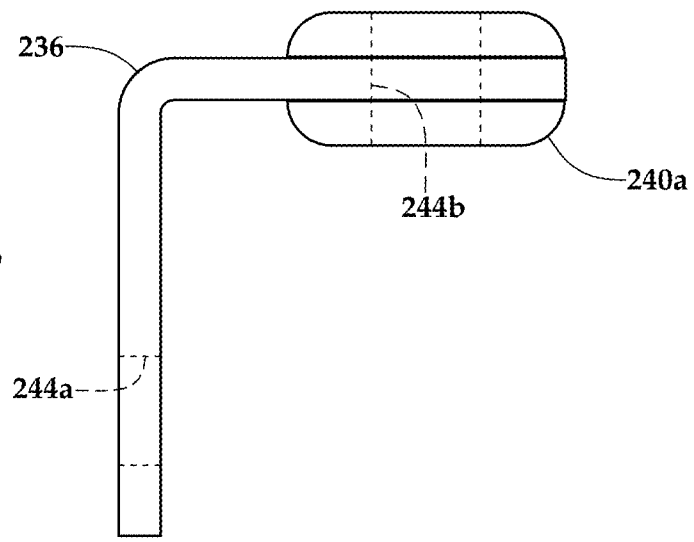
Figure 9C:
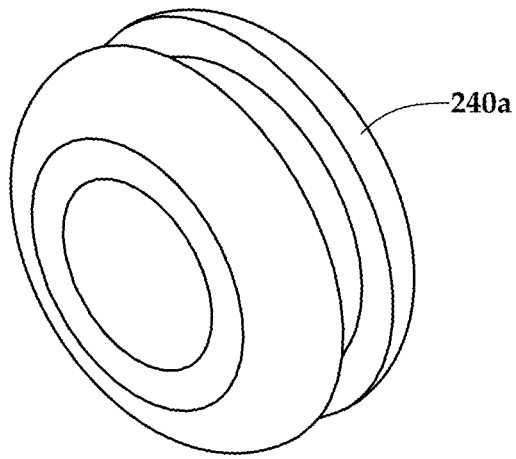

Referring additionally to FIGS. 9A-9C in the drawings, left bracket 236 has an upstream end coupled to the aft side of air plenum 204 and a downstream end coupled to left side 206a of air runner assembly 206. A vibration isolator 240a is coupled to left bracket 236 and interposed between air plenum 204 and left air intake runner 208 of air runner assembly 206 to inhibit engine vibrations from being transferred to air plenum 204 via air runner assembly 206. The aft side of air plenum 204 includes a raised left boss 242a and the upstream end of bracket 236 defines an upstream fastener hole 244a. An upstream fastener 246a is inserted through upstream fastener hole 244a and left boss 242a to secure the upstream end of left bracket 236 to air plenum 204. Left side 206a of air runner assembly 206 and left air intake runner 208 includes a raised boss 242b and the downstream end of bracket 236 defines a downstream fastener hole 244b. In the illustrated embodiment, vibration isolator 240a is a grommet that is received by downstream fastener hole 244b defined by the downstream end of bracket 236. A downstream fastener 246b is inserted through vibration isolator 240a, downstream fastener hole 244b and boss 242b to secure the downstream end of left bracket 236 to air runner assembly 206, with vibration isolator 240a interposed between left bracket 236 and air runner assembly 206 to inhibit the transfer of vibrations therebetween. Alternatively or additionally, a vibration isolator such as a grommet may be inserted in upstream fastener hole 244a so that a vibration isolator is interposed between the upstream end of bracket 236 and air plenum 204. Right bracket 238 is substantially similar to left bracket 236 therefore, for sake of efficiency, certain features have been disclosed only with regard to left bracket 236. One having ordinary skill in the art, however, will fully appreciate an understanding of right bracket 238 based upon the disclosure herein of left bracket 236. For example, the upstream end of right bracket 238 is coupled to right boss 248*a* on the aft side of air plenum 204 using upstream fastener 250*a* and the downstream end of right bracket 238 is coupled to boss 248*b* on right side 206*b* of air runner assembly 206 and right air intake runner 212 using downstream fastener 250*b*, with vibration isolator 240*b* interposed between the downstream end of right bracket 238 and air runner assembly 206 to inhibit the transfer of vibrations therebetween. Alternatively or additionally, brackets may be located at positions other than left and right sides 206*a*, 206*b* of air runner assembly 206 such as above and/or below air runner assembly 206. In the illustrated embodiment, brackets 236, 238 are depicted as L-brackets, although in other embodiments brackets 236, 238 may have any shape. Vibration isolators 240*a*, 240*b*, which are depicted as grommets in the illustrated embodiment, may be formed from an elastomeric material such as rubber that is adapted to absorb shocks and other vibrations. The use of vibration isolators 240*a*, 240*b* in conjunction with brackets 236, 238 provides brackets 236, 238 with the ability to secure air plenum 204 to air runner assembly 206 while inhibiting the transfer of vibration therebetween, thereby protecting components attached to air plenum 204 such as throttle body 202. The use of the illustrative vibration isolation devices disclosed herein allows for a wide range of engine configurations including configurations in which air plenum 204 is positioned above engine body assembly 102.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An engine for a vehicle, the engine comprising:
    an engine body assembly including a cylinder head and a cylinder head cover, the cylinder head defining one or more bosses;
    an air intake system including an air plenum, the air plenum positioned above the engine body assembly;
    an air plenum support bracket having an upper arm coupled to the air plenum and a lower arm coupled to the one or more bosses defined by the cylinder head, thereby bypassing the cylinder head cover; and
    a vibration isolator coupled to the air plenum support bracket and interposed between the air plenum and the engine body assembly, thereby inhibiting engine vibrations from transferring to the air plenum.

2. The engine as recited in claim 1 wherein, the engine body assembly has a left side and a right side and the air plenum has a left side and a right side;
    wherein, the air plenum support bracket comprises a left air plenum support bracket and a right air plenum support bracket, the left and right air plenum support brackets nonuniformly shaped; and
    wherein, the left air plenum support bracket couples the left side of the air plenum to the left side of the engine body assembly and the right air plenum support bracket couples the right side of the air plenum to the right side of the engine body assembly.

3. The engine as recited in claim 1
    wherein, the lower arm of the air plenum support bracket defines a fastener hole; and
    wherein, the engine further comprises a fastener insertable through the fastener hole defined by the lower arm of the air plenum support bracket and the one or more bosses defined by the cylinder head to secure the lower arm of the air plenum support bracket to the engine body assembly.

4. The engine as recited in claim 1 wherein, the upper arm of the air plenum support bracket defines a fastener hole;
    wherein, the vibration isolator has an underside defining a fastener hole and a top side defining a rod;
    wherein, the air plenum includes a boss configured to receive the rod of the vibration isolator; and
    wherein, the engine further comprises a fastener insertable through the fastener hole of the upper arm of the air plenum support bracket and the fastener hole defined by the underside of the vibration isolator to secure the upper arm of the air plenum support bracket to the vibration isolator.

5. The engine as recited in claim 1 wherein, the upper arm of the air plenum support bracket defines a vibration isolator support platform, the vibration isolator interposed between the vibration isolator support platform and the air plenum such that the upper arm of the air plenum support bracket is coupled to the air plenum via the vibration isolator.

6. The engine as recited in claim 1 wherein, the lower arm of the air plenum support bracket bifurcates into a forward arm and an aft arm, the forward and aft arms each coupled to the engine body assembly.

7. The engine as recited in claim 1 wherein, the engine body assembly has lateral sides, the lower arm of the air plenum support bracket coupled to one of the lateral sides of the engine body assembly;
    wherein, the air plenum has an underside, the upper arm of the air plenum support bracket coupled to a forward portion of the underside of the air plenum;
    wherein, the vibration isolator comprises a substantially cylindrical vibration isolator; and
    wherein, the vibration isolator comprises an elastomeric material.

8. An engine for a vehicle, the engine comprising:
    an engine body assembly; and
    an air intake system coupled to the engine body assembly, the air intake system comprising:
    an air plenum having a downstream portion defining an air discharge port;
    an air intake runner having an upstream end defining an air inlet port in fluid communication with the air discharge port of the air plenum;
    a bracket having an upstream end coupled to the downstream portion of the air plenum adjacent to the air discharge port and a downstream end coupled to the air inlet port defined by the upstream end of the air intake runner; and a vibration isolator coupled to the bracket and interposed between the air plenum and the air intake runner, the vibration isolator inhibiting engine vibrations from transferring to the air plenum.

9. The engine as recited in claim 8 wherein, the air plenum has an aft side including a boss;

wherein, the air intake runner has a lateral side including a boss;

wherein, the upstream and downstream ends of the bracket each define a fastener hole; and wherein, the air intake system further comprises:

a first fastener insertable through the fastener hole defined by the upstream end of the bracket and the boss on the aft side of the air plenum; and a second fastener insertable through the fastener hole defined by the downstream end of the bracket and the boss on the lateral side of the air intake runner.

10. The engine as recited in claim 8 wherein, the air plenum is disposed above the engine block assembly;

wherein, the air plenum has a plurality of air discharge ports and the air intake runner comprises an air runner assembly including a plurality of air intake runners each having an air inlet port, each air inlet port in fluid communication with a respective one of the air discharge ports, the air runner assembly having lateral sides including a left side and a right side;

wherein, the bracket comprises a left bracket having an upstream end coupled to the air plenum and a downstream end coupled to the left side of the air runner assembly and a right bracket having an upstream end coupled to the air plenum and a downstream end coupled to the right side of the air runner assembly; and wherein, the vibration isolator comprises a left vibration isolator and a right vibration isolator, the left vibration isolator coupled to the left bracket and interposed between the air plenum and the left side of the air runner assembly, the right vibration isolator coupled to the right bracket and interposed between the air plenum and the right side of the air runner assembly.

11. The engine as recited in claim 8 wherein, the bracket comprises an L-bracket; and wherein, the vibration isolator comprises an elastomeric material.

12. The engine as recited in claim 8 wherein, the vibration isolator comprises a grommet; and wherein, the bracket defines a fastener hole configured to receive the grommet.

13. The engine as recited in claim 12 wherein, the downstream end of the bracket defines the fastener hole configured to receive the grommet such that the grommet is interposed between the bracket and the air intake runner.

* * * * *